United States Patent
Takeuchi et al.

(10) Patent No.: US 9,177,676 B2
(45) Date of Patent: Nov. 3, 2015

(54) NUCLEAR REACTOR POWER MONITOR

(75) Inventors: Yutaka Takeuchi, Tochigi (JP); Hiroshi Ono, Yokohama (JP); Kazuki Yano, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 263 days.

(21) Appl. No.: 13/697,950

(22) PCT Filed: May 11, 2011

(86) PCT No.: PCT/JP2011/060840
§ 371 (c)(1),
(2), (4) Date: Nov. 14, 2012

(87) PCT Pub. No.: WO2011/142383
PCT Pub. Date: Nov. 17, 2011

(65) Prior Publication Data
US 2013/0058447 A1    Mar. 7, 2013

(30) Foreign Application Priority Data

May 14, 2010 (JP) .................................. 2010-112458
Dec. 21, 2010 (JP) .................................. 2010-284651

(51) Int. Cl.
G21C 17/00 (2006.01)
G21C 17/10 (2006.01)
G21D 3/00 (2006.01)

(52) U.S. Cl.
CPC ................ G21C 17/00 (2013.01); G21C 17/10 (2013.01); G21D 3/001 (2013.01); G21D 2003/005 (2013.01); Y02E 30/40 (2013.01)

(58) Field of Classification Search
CPC ........ G21C 17/00; G21C 17/10; G21D 3/001; G21D 2003/005
USPC .................. 376/215, 216, 217, 241, 254, 259
See application file for complete search history.

(56) References Cited

U.S. PATENT DOCUMENTS 4,642,213 A    2/1987 Impink, Jr.
5,481,575 A *  1/1996 Back et al. ..................... 376/259

(Continued)

FOREIGN PATENT DOCUMENTS

JP    57-030990 A    2/1982
JP    60-7392 A      1/1985

(Continued)

OTHER PUBLICATIONS

Notification of Reasons for Refusal mailed Feb. 4, 2014 in Japanese Application No. 2010-284651 with English Translation.

(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

Provide a nuclear reactor power monitoring technology for enhancing the monitoring accuracy and reliability in nuclear thermal hydraulic stability.
A power monitor 30 includes a first calculation unit 42,52 configured to calculate a first stability index based on time series data indicating power oscillation in nuclear instrumentation signals outputted from a plurality of nuclear instrumentation detectors 31; a first determination unit 44,53 configured to compare the first stability index and a first reference value and determine whether nuclear thermal hydraulic stability of the reactor core is stable or deteriorated; a second calculation unit 46,54 configured to calculate a second stability index of the reactor core based on the time series data when the deteriorated state is determined in the first determination unit 44,53; and a second determination unit 47,55 configured to compare the second stability index and a second reference value and determine whether to perform suppressing operation of the power oscillation.

25 Claims, 31 Drawing Sheets

(56) References Cited

U.S. PATENT DOCUMENTS

| | | | |
|---|---|---|---|
| 5,875,221 A | 2/1999 | Kreuter et al. | 376/254 |
| 6,173,026 B1* | 1/2001 | Mowry et al. | 376/259 |
| 6,339,629 B1 | 1/2002 | Takeuchi et al. | 376/254 |
| 8,135,106 B2* | 3/2012 | Farawila et al. | 376/254 |
| 2010/0254504 A1* | 10/2010 | Sakai et al. | 376/254 |

FOREIGN PATENT DOCUMENTS

| | | |
|---|---|---|
| JP | 6 201884 | 7/1994 |
| JP | 7 167981 | 7/1995 |
| JP | 11 231089 | 8/1999 |
| JP | 2000 121778 | 4/2000 |
| JP | 2002 221590 | 8/2002 |
| JP | 2004 125444 | 4/2004 |
| JP | 2005 241657 | 9/2005 |
| JP | 2011 137701 | 7/2011 |

OTHER PUBLICATIONS

Notification of Reasons for Refusal mailed Feb. 4, 2014 in Japanese Application No. 2010-112458 with English Translation.

International Preliminary Report on Patentability Issued Dec. 10, 2012 in PCT/JP11/60840 Filed May 11, 2011.

International Search Report Issued Aug. 9, 2011 in PCT/JP11/60840 Filed May 11, 2011.

Extended European Search Report issued on May 19, 2015 in Patent Application No. 11780640.6.

* cited by examiner

NUCLEAR REACTOR POWER MONITOR

TECHNICAL FIELD

The present invention relates to a technology for monitoring nuclear reactor power during operation.

BACKGROUND ART

In the boiling water reactor (BWR), output power can be controlled by changing a core flow and thereby changing a steam ratio (void fraction) inside a boiling reactor core.

However, it is known that depending on the core flow and other operating conditions, neutron flux distribution and liquidity in the reactor core are destabilized by delayed transportation of voids and a negative feedback effect caused by negative void reactivity coefficients in the reactor core.

There is concern that occurrence of such a nuclear thermal hydraulic destabilization phenomenon may result in considerable oscillation of output power and flow rate, which may deteriorate cooling characteristics in terms of fuel rod surface temperature and may damage the soundness of fuel rod cladding tubes.

Accordingly, in designing fuels and reactor cores for the boiling water reactor, the nuclear thermal hydraulic stability is analyzed to produce a design that gives sufficient margin to stability so as to prevent such an oscillation phenomenon from occurring in any of the expected operating ranges.

In such a range where deterioration in nuclear thermal hydraulic stability is expected, limited operation is preset for safety. Nuclear reactors of some types are provided with a safety setting so that in the unlikely event where the nuclear reactor reaches the operation limited range, output power is lowered by insertion of control rods and the like so that the nuclear reactor can get out of the operation limited range.

There are a large number of nuclear power plants which allow, from a viewpoint of Detect and Suppress, power oscillation phenomena while accurately detecting the power oscillation phenomena attributed to nuclear thermal hydraulic destabilization and suppressing the oscillations before the fuel soundness is damaged.

Accordingly, a power oscillation detection algorithm with use of dedicated detection signals for detecting the power oscillation phenomenon, which is referred to as OPRM (Oscillation Power Range Monitor), has been proposed (e.g., Patent Literature 1).

There is also known a technique to analyze principal components in an oscillation based on a plurality of nuclear instrumentation signals, extract independent components different in oscillation modes, and to evaluate core-wide stability and regional stability which are stability different in oscillation modes (e.g., Patent Literature 2).

There is also known a technique to evaluate nuclear thermal hydraulic stability in consideration of parameters such as reactor core average neutron flux measurement values (APRM), delay corresponding to a heat-transfer time constant in fuel rods, and main steam flow rate measurement values (e.g., Patent Literature 3).

Further, there is known an apparatus adapted to perform prediction analysis of stability based on decay ratios and to issue an alarm when sequentially detected stability of the reactor core exceeds a predicted value (e.g., Patent Literature 4).

There is also known a technology to successively calculate deterioration indexes of nuclear thermal hydraulic stability in a boiling water reactor based on plant information, such as reactor core power distributions, reactor core flows, reactor core pressure and feed water temperature, and to issue an alarm when these indexes exceed preset values (e.g., Patent Literature 5).

In addition, there is known a method for monitoring stability based on neutron flux space mode distributions obtained by calculation of reactor core characteristic values using a large number of LPRM signals (e.g., Patent Literature 6).

CITATION LIST

Patent Literatures

Patent Literature 1: U.S. Pat. No. 5,555,279A
Patent Literature 2: JP2002-221590A
Patent Literature 3: JP2002-181984A
Patent Literature 4: JP2000-314793A
Patent Literature 5: JP2000-121778A
Patent Literature 6: JP1999-231089A

SUMMARY OF THE INVENTION

Technical Problem

As the boiling water reactors are made to have a larger size, a higher power density and a higher burn-up, their nuclear thermal hydraulic stability is generally declined. However, in Patent Literature 1, a measure is not taken for such problem of the boiling water reactors. While an allowance of nuclear thermal hydraulic stability is inevitably declined in connection with increase in reactor core power and power density, enhancement of monitoring accuracy in nuclear thermal hydraulic stability is now demanded more than before.

However, in the cases of Patent Literature 2 to Patent Literature 6, it is not possible to enhance the monitoring accuracy in the nuclear thermal hydraulic stability more than before, while an allowance of nuclear thermal hydraulic stability is inevitably declined in connection with increase in reactor core power and power density.

The present invention has been made in order to solve the above-mentioned problems and it is an object of the present invention to provide a technology for enhancing the monitoring accuracy and reliability in nuclear thermal hydraulic stability of a nuclear reactor.

BRIEF DESCRIPTION OF THE FIGS

FIG. 28A is a graph view showing a plurality of overwritten decay ratios (of six signals) in the process of nuclear thermal hydraulic stability in the nuclear instrumentation signals shifting from a stable state to a deteriorated state, while

FIG. 29A is a graph view showing a frequency distribution of decay ratios of a plurality of nuclear instrumentation signals (of 43 signals) at each time point (400 sec to 900 sec) of FIG. 28, while

FIG. 30A is a graph views showing changes in a second stability index calculated over the same period as that in FIG. 28, when a first reference value is 0.8, while

Figure 37A:
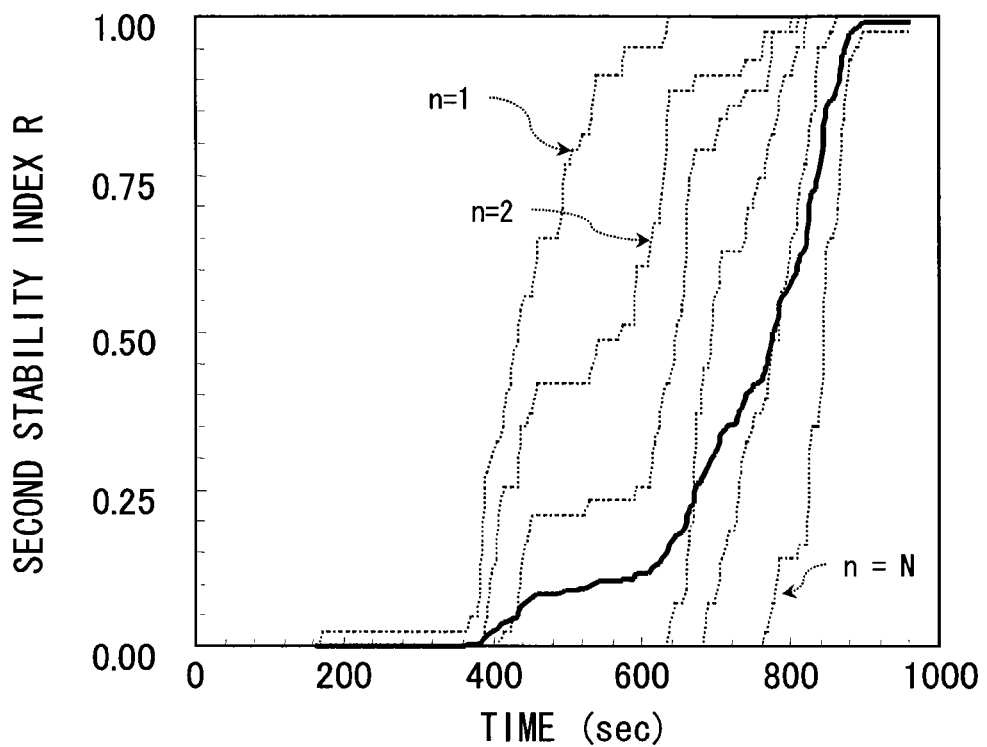
Figure 37B:
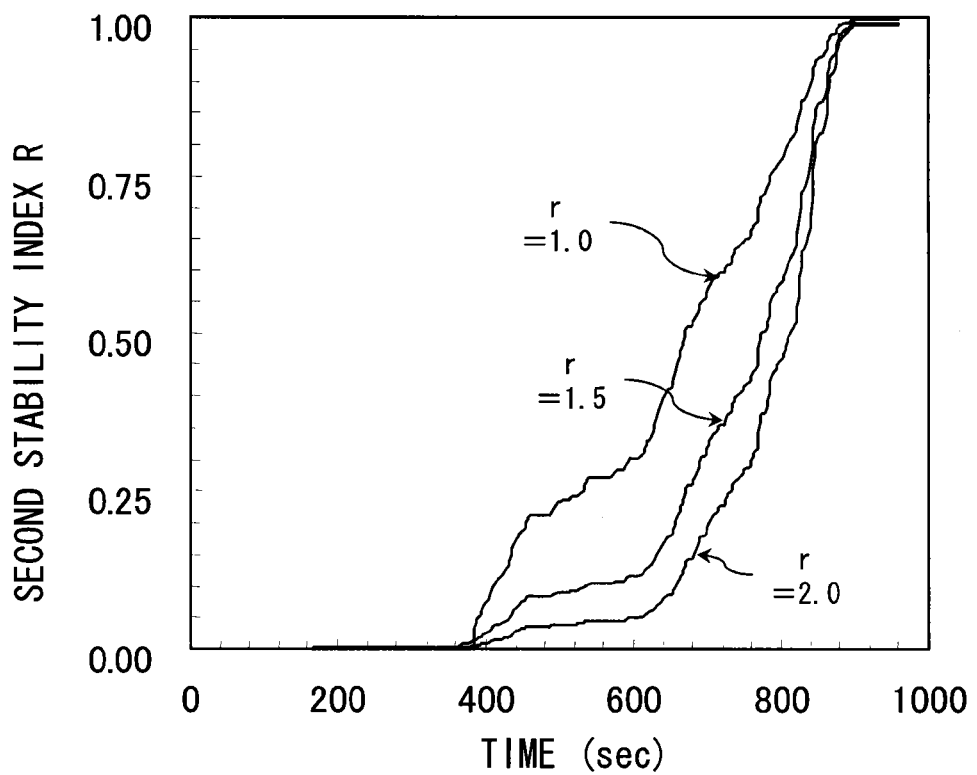

FIG. 37A is a graph view showing changes in a second stability index calculated with the application of a weighting factor involving gradual change of a first reference value in the range of 0.5 to 0.95 in the same period as that in FIG. 28 in the fourth embodiment, while FIG. 37B is a graph view in the case where the common ratio of a weighting factor which forms a geometrical progression is varied to 1.0, 1.5, and 2.0.

Figure 38:
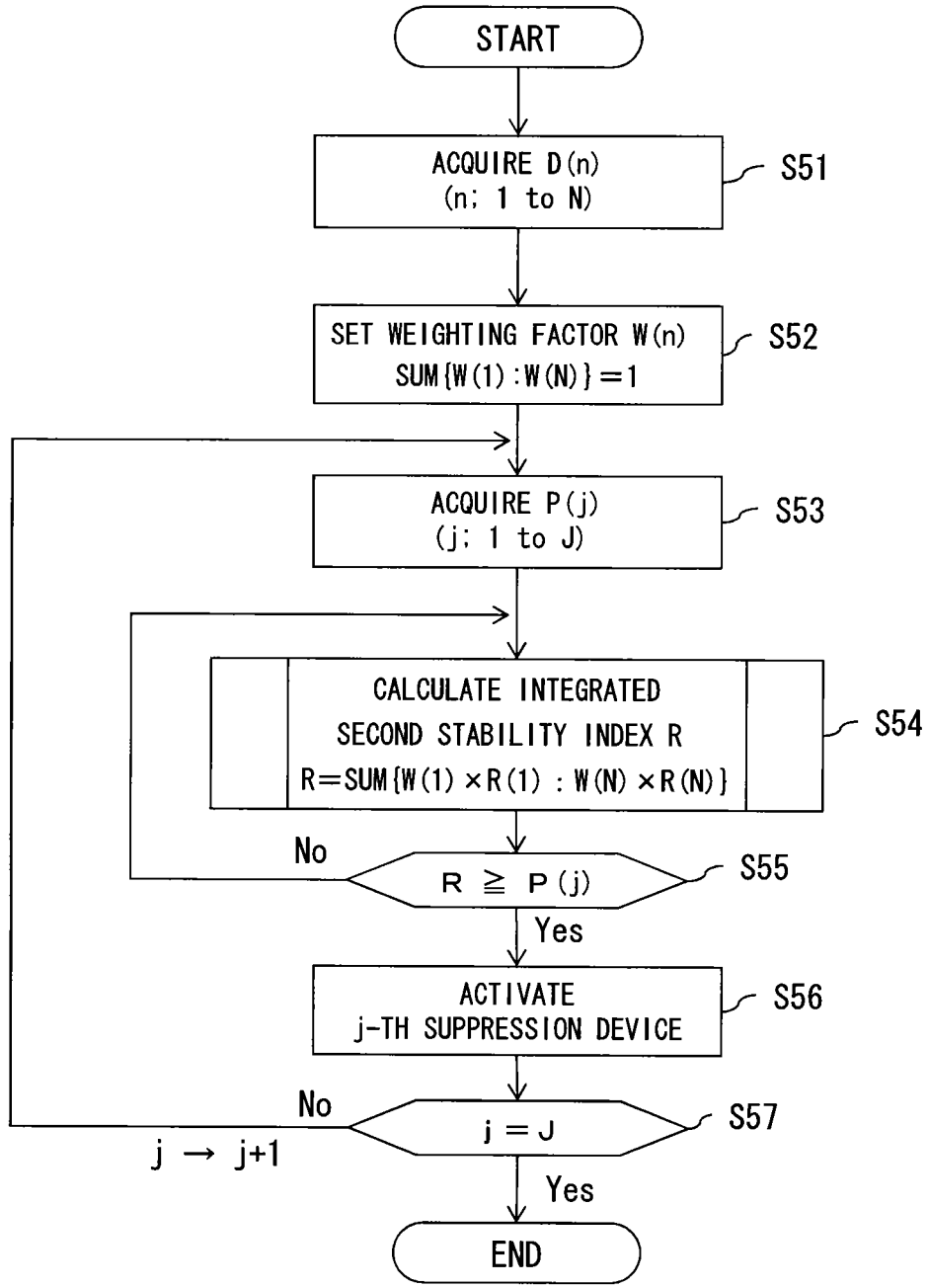

FIG. 38 is a flowchart explaining operation of the nuclear reactor power monitor according to the fourth embodiment.

DESCRIPTION OF EMBODIMENTS

First Embodiment

The embodiments of the present invention will be described hereinbelow with reference to the accompanying drawings.

Figure 1:
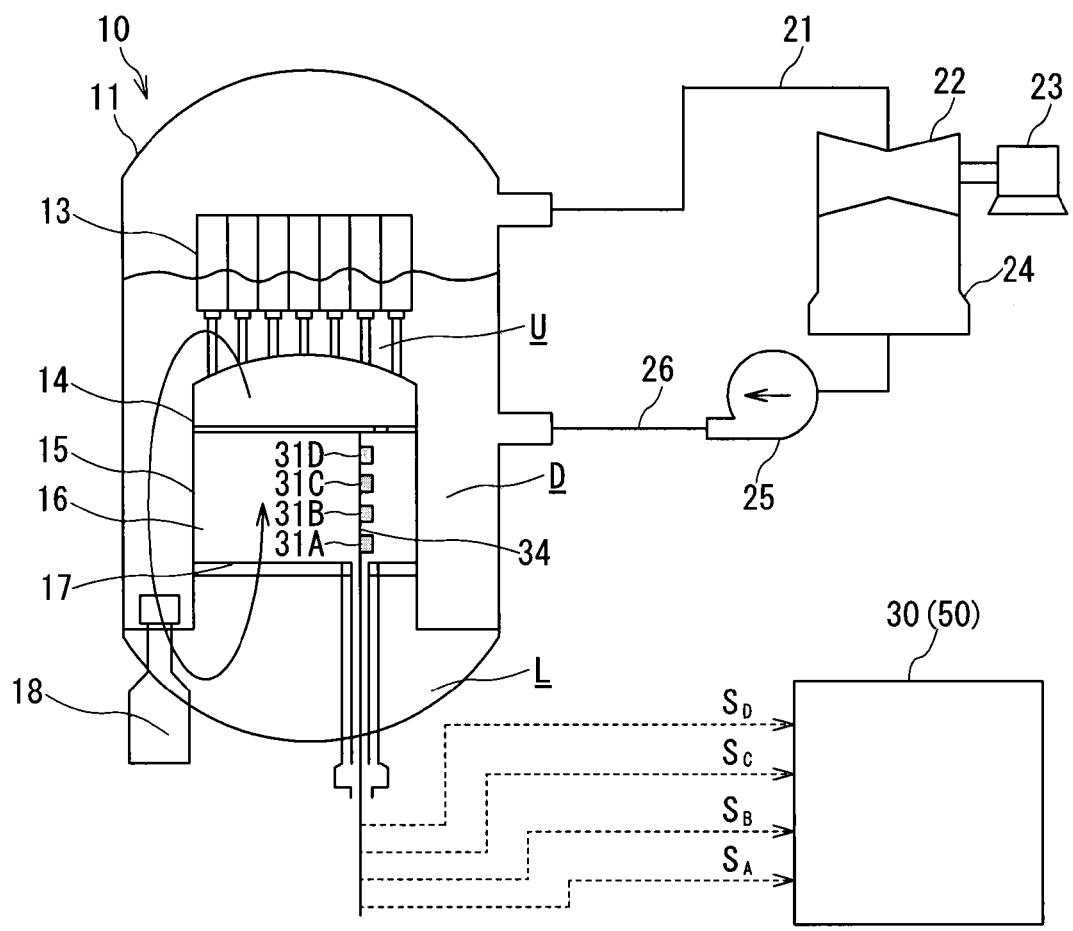
FIG. 1 is a longitudinal sectional view showing an embodiment of a nuclear power plant to which a nuclear reactor power monitor according to the present invention is applied.

A nuclear power generation system shown in FIG. 1 includes: a nuclear reactor 10 which heats furnace water by the heat generated through nuclear fission of nuclear fuel and thereby generates steam; a main line 21 which guides the generated steam to a turbine 22; a generator 23 coaxially connected with the turbine 22 which is rotationally driven by the steam to convert rotational kinetic energy to electric energy; a condenser 24 which cools and condenses the steam, which was expanded in the process of doing its work in the turbine 22, into condensate water; and a water supply line 26 which sends the condensate water to the nuclear reactor 10 with a pump 25.

Feed water returned to the nuclear reactor 10 is reheated as furnace water, and the above-stated process is repeated to perform continuous power generation. To sustain the power generation in a stable manner, a nuclear reactor power monitor 30(50) is provided.

The nuclear reactor 10 includes: a pressure vessel 11 filled with furnace water and provided with a shroud 15 fixed to the inside thereof; a core support plate 17 fixed to the shroud 15; a reactor core 16 enclosed by the shroud 15 which is supported by the core support plate 17; and a steam separator 13 which performs gas-liquid separation of the furnace water which has been changed into a gas-liquid two-phase flow by passing through the reactor core 16.

The steam as the one product obtained by steam separation in the steam separator 13 is guided to the main line 21 as described above so as to contribute to power generation, while the other product obtained as separated water joins the feed water returned through the water supply line 26. The thus-joined furnace water is made to flow down an area (downcomer D) between the shroud 15 and the pressure vessel 11 with a plurality of recirculation pumps 18 (only one pump is described in the drawing) provided in a circumferential direction, and is guided to a lower plenum area L.

The furnace water guided to the lower plenum area L again passes the reactor core 16, where the water is heated into a gas-liquid two-phase flow before reaching an upper plenum area U. The gas-liquid two-phase flow that reached the upper plenum area U is again guided to the steam separator 13, where the aforementioned process is repeated.

Figure 2:
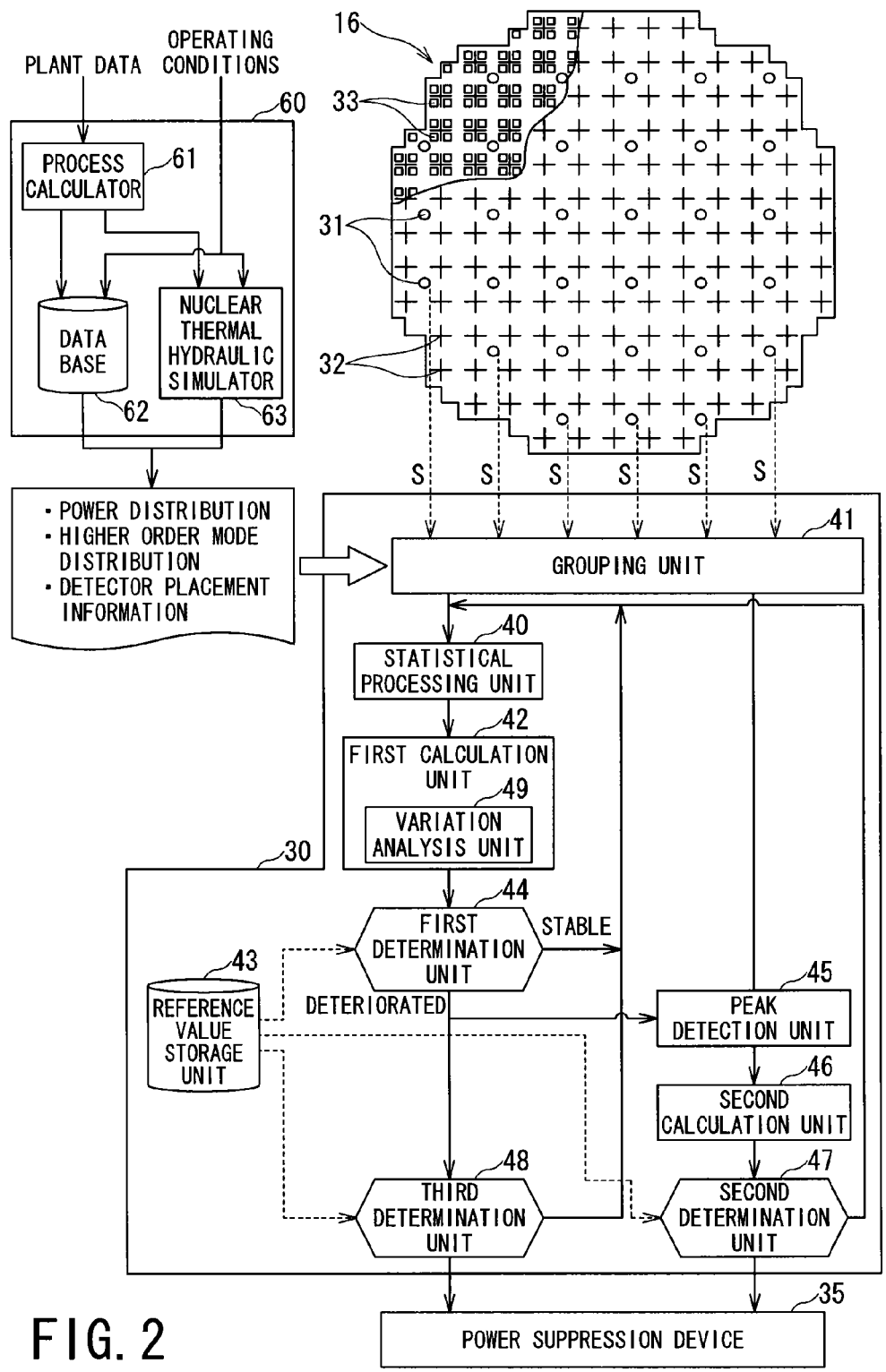
FIG. 2 is a block diagram showing a first embodiment of a nuclear reactor power monitor according to the present invention.

As shown in a horizontal sectional view of FIG. 2, the reactor core 16 includes: a square cylinder-shaped fuel assembly 33 containing a large number of fuel rods (omitted in the drawing); a control rod 32 which absorbs neutrons generated by a nuclear fission reaction to control output power; and an instrumentation pipe 34 whose upper and lower ends are respectively fixed to an upper grid plate 14 and the core support plate 17 and which supports nuclear instrumentation detectors 31 (31A, 31B, 31C, 31D) for detecting the neutrons as shown in FIG. 1. A large number of these component members are arrayed to structure the reactor core 16.

One instrumentation pipe 34 is generally provided for 16 fuel assemblies 33. For example, an advanced boiling water reactor including 872 fuel assemblies is equipped with 52 instrumentation pipes 34.

The nuclear instrumentation detectors 31A, 31B, 31C, 31D provided at four positions in a perpendicular direction of the instrumentation pipe 34 are each referred to as a level A, a level B, a level C, and a level D in accordance with a height position from the lower side. The furnace water which circulates inside the reactor core 16 flows into the furnace from the level A, where the furnace water is heated with fuel and starts to boil. The furnace water reaches the level B, the level C, and the level D in sequence while its water/steam two-phase state is being changed.

The nuclear thermal hydraulic stability is greatly influenced by pressure propagation in the water/steam two-phase state.

More specifically, due to a delay in pressure propagation of the furnace water which flows from the lower side to the upper side in the reactor core 16 as shown in FIG. 1, the two-phase state (water and steam ratio) is changed. This causes a response delay of the nuclear instrumentation detectors 31A, 31B, 31C, 31D, which in turn causes phase difference between the respective nuclear instrumentation signals S ($S_A$, $S_B$, $S_C$, $S_D$) detected at the level A, the level B, the level C, and the level D.

Such phase difference in power oscillations in a flow direction of furnace water has a mechanism of causing mutual cancellation of the responses of the nuclear instrumentation signals S. Therefore, from the viewpoint of accuracy and reliability in monitoring the nuclear thermal hydraulic stability, it is preferable that a plurality of the nuclear instrumentation signals S at the same height level are grouped and evaluation is performed for each group.

The necessity of performing stability monitoring on all the levels from the level A to level D is low. Accordingly, in each of the embodiments, evaluation of the nuclear thermal hydraulic stability is performed by targeting a level B group, which is generally said to have the highest sensibility for stability monitoring.

The power oscillations relating to the nuclear thermal hydraulic stability are a macroscopic phenomenon which occurs in the entire reactor core due to destabilization of flow conditions inside a fuel channel which encloses the fuel assembly 33, the destabilization being caused by reactivity feedback to dynamic responses of neutron fluxes. It is considered that the reactivity feedback excites a neutron flux space mode, which results in occurrence of power oscillations.

When the excited space mode is a basic mode, the power oscillations caused thereby are called core-wide oscillations. The core-wide oscillations basically have the same phase in each of the reactor core cross section at the same height level. In this case, a plurality of nuclear instrumentation signals S measured in the same cross section have almost no phase difference from each other. They are not cancelled by addition, and therefore oscillations can sufficiently be detected with use of average power range monitor (APRM) signals.

In contrast, when the excited space mode is a higher order mode, the oscillations thereby are called regional oscillations. According to the higher order space mode distribution, the nuclear instrumentation signals S in the reactor core cross section at the same height have phase difference from each other. With a node of the higher order space mode distribution as a center line of oscillations, 180-degree phase difference appears across the center line, and oscillations are reversed at this center line.

Figure 3A:
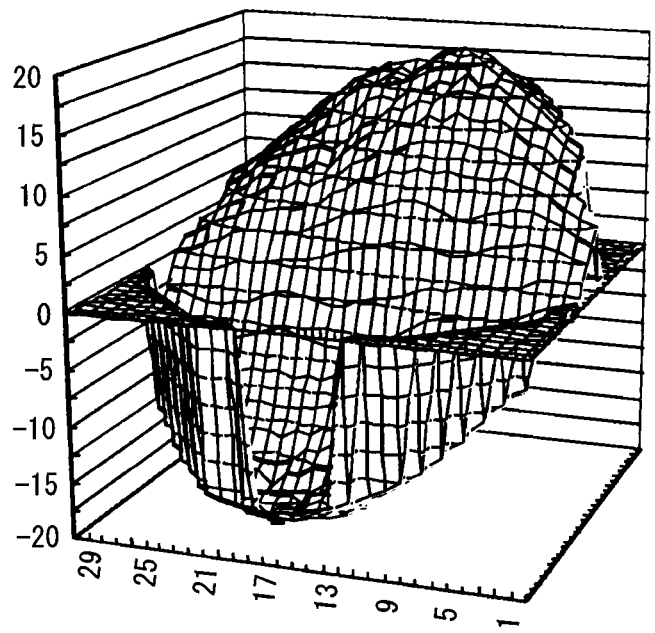
FIG. 3A and FIG. 3B are explanatory views showing a regional oscillation and a higher order space mode distribution estimated in a state estimation unit.
Figure 3B:
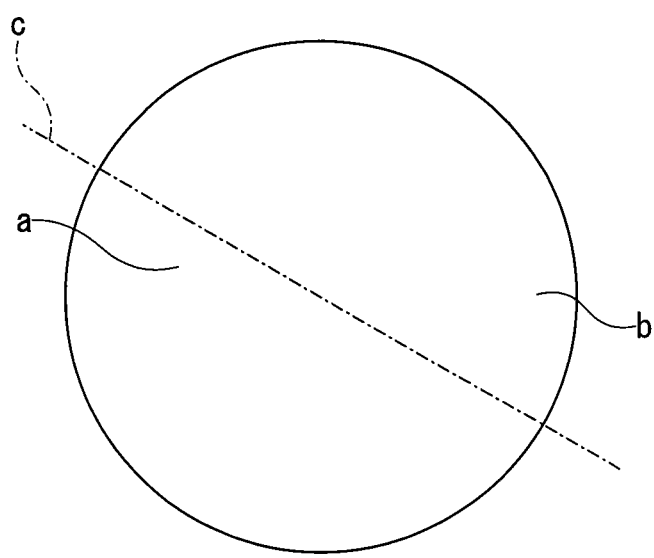

FIG. 3A shows a higher order space mode distribution in the regional oscillations. As shown in the horizontal cross sectional view of FIG. 3B, two areas a and b across an oscillation center line c, which corresponds to a node, are opposite in phase from each other, i.e., they oscillate with 180-degree phase difference from each other.

In this case, if a plurality of the nuclear instrumentation signals S across these two areas a and b are averaged, oscillations are cancelled due to the phase difference. Accordingly, the amplitude of the averaged signals is flattened and this makes it difficult to detect oscillations. In short, it is not suitable for detection of such regional oscillations to use the APRM signal outputted as a signal formed by averaging all the reactor core signals.

Although not shown in the drawings, use of the APRM signal is also unsuitable in the case of detecting local power oscillations which occur in a narrow area centering around a certain specific fuel assembly 33 (FIG. 2).

As shown in FIG. 2, a power monitor 30 includes a first calculation unit 42 configured to calculate a first stability index based on time series data $X_t$ (FIG. 6) indicating power oscillation in nuclear instrumentation signals S outputted from a plurality of nuclear instrumentation detectors 31 which detect neutrons in a reactor core 16; a first determination unit 44 configured to compare the first stability index and a first reference value and determine whether nuclear thermal hydraulic stability of the reactor core 16 is stable or deteriorated; a second calculation unit 46 configured to calculate a second stability index of the reactor core 16 based on the time series data $X_t$ when the deteriorated state is determined in the first determination unit 44; and a second determination unit 47 configured to compare the second stability index and a second reference value and determine whether to perform suppressing operation of the power oscillation. The power monitor 30 is further configured to include a peak detection unit 45, a third determination unit 48, and a statistical processing unit 40.

A grouping unit 41 is configured to divide the nuclear instrumentation detectors 31 into groups based on information (such as power distributions of the reactor core, higher order space mode distributions of neutron fluxes, or specified positions of fuel assembly 33) transmitted from a state estimation unit 60.

It is to be noted that the nuclear instrumentation signals S processed in the later-described first determination unit 44 and the second determination unit 47 may be individual signals of the nuclear instrumentation detectors 31 selected from a group, or an average signal of the nuclear instrumentation detectors 31 in units of a group.

The state estimation unit 60 includes a process calculator 61, a data base 62, and a nuclear thermal hydraulic simulator 63.

The thus-configured state estimation unit 60 transmits information, such as reactor core power distributions estimated based on a physical model or a data base, higher order space mode distributions of neutron fluxes, and placement information on the nuclear instrumentation detectors 31, to the grouping unit 41.

The statistical processing unit 40 is configured to apply a statistical method, such as an autoregression analysis method, an autocorrelation function method or a spectrum-analysis method, to time series data $X_t$ (FIG. 6) indicating power oscillation in the nuclear instrumentation signals S outputted from the nuclear instrumentation detectors 31 which detect neutrons in the reactor core.

The first calculation unit 42 is configured to calculate the first stability index based on the time series data in the nuclear instrumentation signals S. In a variation analysis unit 49 included in the first calculation unit 42, a variance or a standard deviation $\sigma_T(t)$ is derived as the first stability index which indicates variations in oscillation period T in a plurality of the time series data $X_t$. It is to be noted that time series data $X_t$ including an oscillation period varied beyond a fixed range is excluded as an outlier in calculation of the standard deviation $\sigma_T(t)$.

A reference value storage unit 43 is configured to store a first reference value, a second reference value and a third reference value which are used as the reference value in each of the first determination unit 44, the second determination unit 47 and the third determination unit 48.

The first determination unit 44 is configured to compare the first stability index and the first reference value and determine whether nuclear thermal hydraulic stability of the reactor core is stable or deteriorated. If it is determined that the stability is stable, monitoring based on operation of the variation analysis unit 49 is continued, whereas if it is determined that the stability is deteriorated, the operation is then shifted to monitoring by peak detection. Even after the operation is shifted to the monitoring by peak detection, and the peak detection unit 45 is in operation, the monitoring by the variation analysis unit 49 is concurrently continued.

The first determination unit 44 determines that the nuclear thermal hydraulic stability is deteriorated when the first stability index or the standard deviation $\sigma_T(t)$ of oscillation periods exceeds the first reference value for a predetermined time in succession.

The peak detection unit 45 is configured to execute peak detection of the time series data when it is determined in the first determination unit 44 that the stability is deteriorated.

The peak detection unit 45 fits the time series data set on intervals by a polynomial and searches for a point where a derivative value of the polynomial is equal to zero as a peak. A spline function is applied as the polynomial.

In fitting the time series data to the spline function, it is desirable to conduct spline interpolation at a sampling interval used when the nuclear instrumentation signals S are converted into digital data.

The point where the derivative value of the polynomial is equal to zero is obtained as follows.

First, the zero point is searched within a period of time, composed of half of the oscillation period and a margin, with a switchover point from the first determination unit 44 as an origin. Then, out of a plurality of intervals which are interposed in between data points that constitute the time series data, an interval in which a product of derivatives of the data points placed on both sides thereof is a minus-sign product is obtained. The obtained interval is further divided, and out of these dividing points, a point where an absolute value of a derivative is the minimum is searched as the zero point.

Next, the above-stated search flow is repeated within a period of time, composed of half of the oscillation period and a margin, with the searched point as an origin so as to obtain the zero point.

The second calculation unit 46 is configured to calculate the second stability index of the reactor core based on the result of peak detection of the time series data. Here, an amplitude or a decay ratio of the plurality of the time series data is used as the second stability index.

In short, the searched peak position (time axis) is substituted into the spline function of that interval to have a peak value (vertical axis). A difference between the peak value and a next peak value obtained in the same manner is used as an amplitude, and a time difference between the adjacent peak positions is used as an oscillation period.

The second determination unit 47 is configured to compare the second stability index and the second reference value and to determine whether to operate a power suppression device 35. When the second determination unit 47 does not make a determination to operate the power suppression device 35 in a predetermined time, operation of the second calculation unit is stopped. It is to be noted that the time taken for stopping the operation of the second calculation unit 46 is desirably set longer than the time taken for the first determination unit 44 to make a determination.

While the second calculation unit 46 is operated, the first calculation unit 42 is also concurrently operated. Accordingly, when a determination to execute the reactor core power control is not made by the second determination unit in a predetermined time, operation of the second calculation unit 46 is stopped and only the operation of the first calculation unit 42 is continued.

Even when the second determination unit 47 determines that operation of the power suppression device 35 is not necessary based on the second stability index, the third determination unit 48 still determines that operation of the power suppression device 35 is necessary if the first stability index satisfies the third reference value which is set more severely than the first reference value.

In response to the determination by the first determination unit 44, the second determination unit 47 and the third determination unit 48, any of automatic activation signals of an alarm device (omitted in the drawing), an oscillation information providing device (omitted in the drawing) and the power suppression device 35 may be issued in stages as a power oscillation suppression operation.

Figure 4:
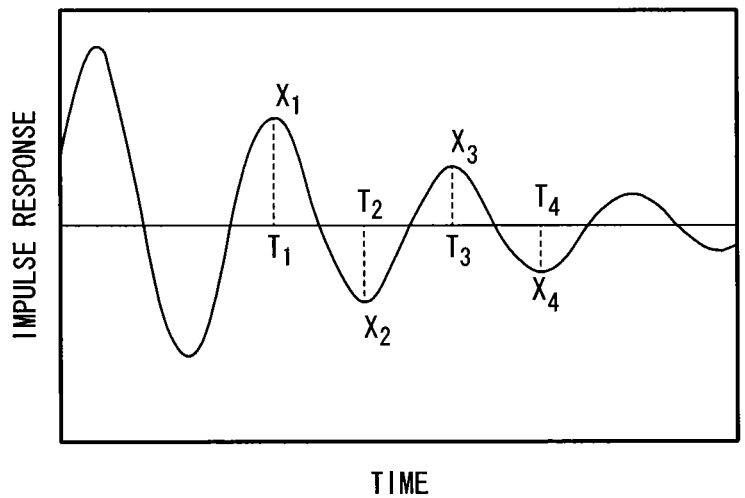
FIG. 4 is a waveform graph view showing an oscillatory impulse response when a disturbance is applied to a system.

Now, with reference to FIG. 4, a decay ratio, an oscillation period, and amplitude will be defined by using an oscillatory impulse response at the time of applying disturbance to a system. Assuming that peaks of the impulse response are set in order as $X_1, X_2, X_3, X_4, \ldots$, and their appearing time are each set as $t_1, t_2, t_3, t_4, \ldots$, the decay ratio, the oscillation period, and the amplitude, which are generally used as indexes indicating the stability of the nuclear thermal hydraulic stability, are defined as follows:

Decay ratio $=(X_3-X_4)/(X_1-X_2)$

Oscillation period $=(t_3-t_1)$ or $(t_4-t_2)$

Amplitude $=(X_3-X_4)$ or $(X_1-X_2)$

As for the phase difference, a time difference in $t_n$ between a plurality of signals is defined as an angle with one period being 360 degrees.

If the decay ratio is less than 1, the impulse response is attenuated and therefore the system is stable, whereas if the decay ratio is more than 1, oscillations grow and the system becomes unstable. When the decay ratio is 1, the oscillations continue with constant amplitude.

With a shorter oscillation period, oscillations grow or attenuate more quickly. An inverse of the oscillation period is generally referred to as a resonance frequency or a natural frequency, which is expressed in the unit of Hz or cps.

Figure 5:
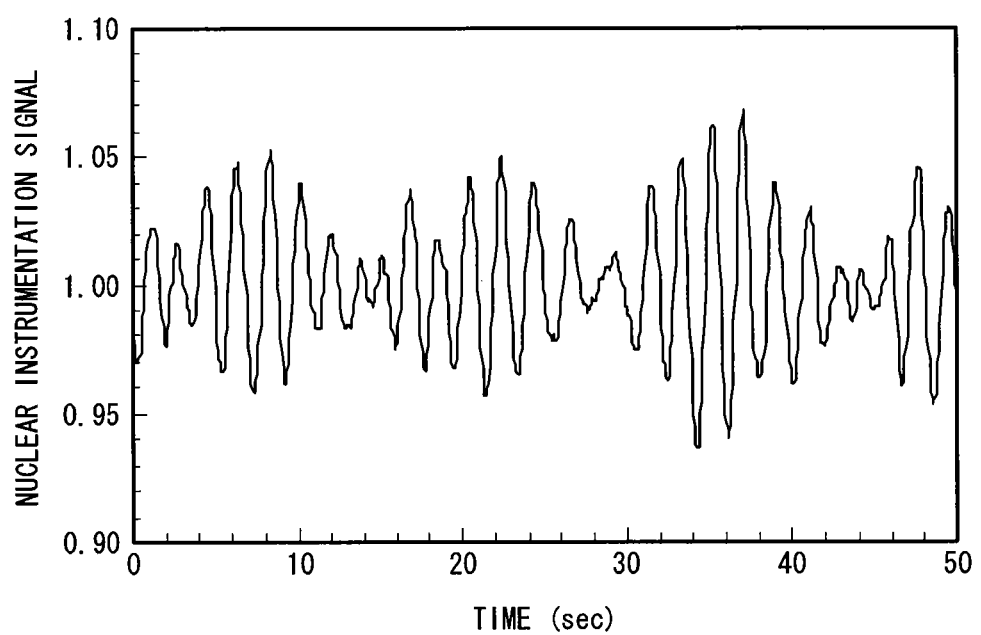
FIG. 5 is a waveform graph view showing a nuclear instrumentation signal outputted from a detector.

While a graph view of FIG. 4 shows an ideal impulse response, a response of an actual nuclear instrumentation signal S does not form an ideal impulse response as shown in FIG. 5. More specifically, in the actual nuclear instrumentation signals S, high-frequency noise and low-frequency trends may be superposed or may make iterated vibration as shown in FIG. 5, so that monotonous attenuation and growth are not demonstrated in some cases.

Accordingly, even if peaks are directly detected from the response of the actual nuclear instrumentation signal S and the decay ratio is calculated based on the amplitude obtained, it is impossible to accurately estimate the decay ratio since the response used is not a genuine impulse response of the system.

Figure 6:
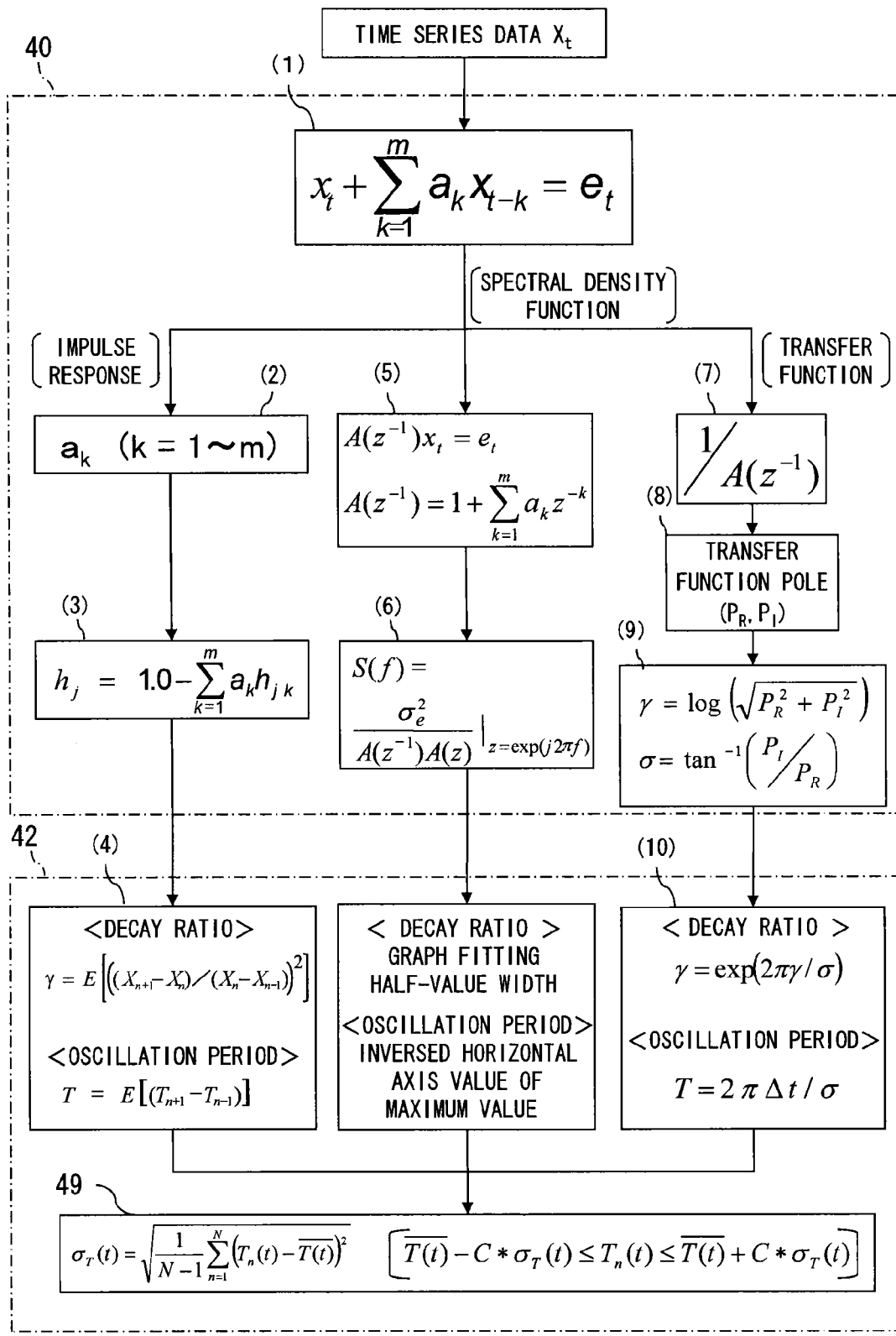
FIG. 6 is an explanatory view of a statistical processing unit, a first calculation unit and a variation analysis unit applied to the present embodiment.

Therefore, in order to calculate the impulse response, it is necessary to estimate a transfer function of the system, and for the estimation, it is necessary to apply a statistical method using a certain data length (a function of the statistical processing unit 40 of FIGS. 2 and 6).

The decay ratio derived from the response of the nuclear instrumentation signal S of FIG. 5 with use of the thus-estimated transfer function is about 0.7 to 0.8. It can be said that the system is stable according to the response though growth and attenuation is repeated therein.

In this case, unless fuel soundness is threatened by power oscillations, it suffices to monitor the system to confirm the instability thereof does not progress, and additional operation to stabilize the system is not particularly needed.

The decay ratio is appropriate in the point that it is an index capable of directly evaluating the nuclear thermal hydraulic stability. However, accurate estimation of the decay ratio requires a certain data length. When the oscillation state depends on the reactor core position as in the case of regional oscillations, the value of the decay ratio varies depending on the nuclear instrumentation signals S to be observed. Accordingly, it becomes difficult to judge whether to conduct additional operation for improving core stability by activating a device such as the power suppression device 35 (FIG. 2).

In the present embodiment, the statistical processing unit 40 and the first calculation unit 42 are used, and an oscillation period of the respective nuclear instrumentation signals S is applied as a parameter for monitoring deterioration of the stability. A plurality of nuclear instrumentation signals S divided into groups by the grouping unit 41 are analyzed by the variation analysis unit 49. Examples of indexes indicating variations include a variance and a standard deviation. Herein, the standard deviation $\sigma_T(t)$ is adopted since its determination criterion is easily to select.

The nuclear instrumentation detectors 31 (LPRM: Local Power Range Monitor system) are divided into groups as described later. Processing by the statistical processing unit 40 is performed in units of a group to obtain an oscillation period of each signal and a standard deviation $\sigma_T(t)$ within each group.

The standard deviation $\sigma_T(t)$ is compared, in the first determination unit 44, with the first reference value in the reference value storage unit 43, and if the determination criterion is satisfied, the peak detection unit 45 is activated with the time of the determination as a reference. After the peak detection unit 45 is activated, the analysis of oscillation period variations by the first determination unit 44 is performed concurrently.

With reference to FIG. 6A, description is given of a method for obtaining the oscillation period by a statistical method.

First, digital processing and processing for removing noise and trend components are applied to nuclear instrumentation signals S to prepare time series data $X_t$. The oscillation period is obtained by a method such as a method for obtaining an autocorrelation function directly from the time series data $X_t$ and setting a delay time with which the correlation function has a maximum value as the oscillation period, a method for obtaining spectral density by a method such as FFT (Fast Fourier Transform) and the autoregressive method and setting an inverse of a frequency (resonance frequency, Hz) at which the spectral density has a maximum value as the oscillation period, a method for obtaining a transfer function by the autoregressive method and obtaining the oscillation period from a resonance frequency estimated from a transfer function pole, and a method for obtaining an impulse response by the autoregressive method and obtaining the oscillation period based on a relation shown in FIG. 4.

When any one of these method is used, a certain data length (including several oscillation periods or more) is needed in order to achieve accurate estimation.

The autocorrelation function is a covariance of the time series data $X_t$ at a certain time t and its past value $X_{t-1}$. A delay time with which the covariance value has a maximum value is equivalent to the oscillation period.

In the autoregressive method, the time series data $X_t$ is subjected to linear fitting such as Formula (1) of FIG. 6 to estimate an autoregression coefficient $a_k$ (FIG. 6(2)). In Formula (1), $e_t$ represents Gaussian noise excluded from the fitting. Some algorithms which efficiently estimate such an autoregressive process have been suggested and widely used.

A time-series temporal response characteristic is reflected upon an autoregression coefficient. By using this coefficient, a decay ratio, an oscillation period, and a phase difference can be obtained.

Examples of the methods for obtaining the decay ratio and the oscillation period with the autoregression coefficient include those involving estimation from each of an impulse response, a spectral density and a transfer function.

First, the impulse response is obtained by Formula (3) of FIG. 6 using the autoregression coefficient.

The impulse response is the response shown in FIG. 4, with which the decay ratio and the oscillation period can be obtained based on Formula (4) of FIG. 6. To suppress estimation variations, an average value is used as an estimated value with respect to the decay ratio and the oscillation period.

An autoregressive process is expressed as shown in Formula (5) of FIG. 6 where a delay operator $Z^{-1}(X_{t-1}=Z^{-1}X_t)$ at discrete (digital) time is used. An inverse of $A(Z^{-1})$ shown in Formula (7) of FIG. 6 is a transfer function from Gaussian noise to time series, and stability information is included in this transfer function.

If this transfer function is used, a spectral density function $S(f)$ will be given by Formula (6) of FIG. 6. A frequency $f_{max}$ at which this spectrum becomes the maximum is the resonance frequency, and an inverse $1/f_{max}$ thereof serves as the oscillation period.

A zero point of $A(Z^{-1})$ corresponds to a pole of the transfer function. Since stability is determined by the positional relation of the pole on a complex plane, the decay ratio and the oscillation frequency can be estimated through estimation of the transfer function pole.

When transfer function pole=$(P_R, P_I)$ is set as in FIG. 6(8), the decay ratio and the oscillation period are expressed as in FIG. 6(10) based on a relation shown in Formula (9) of FIG. 6. In this case, $\Delta t$ represents a sampling period of time series signals.

Now, a group including total N nuclear instrumentation signals S is considered. An oscillation period of the i-th signal in this group is defined as $T_i(t)$. Each oscillation period $T_i(t)$ is calculated by using the statistical method described above.

Figure 7A:
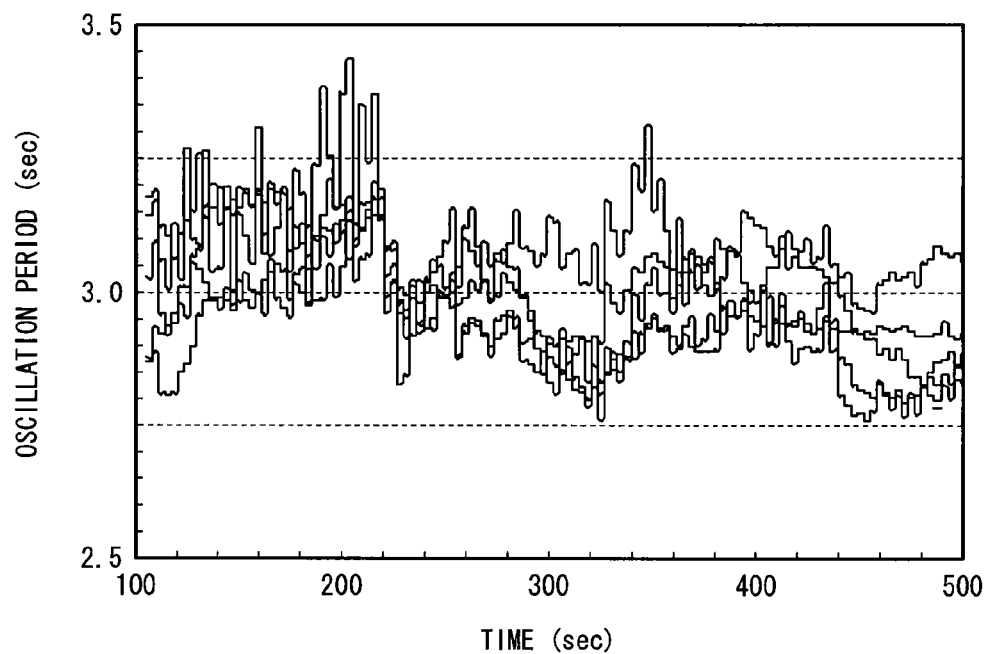
FIG. 7A and FIG. 7B are graph views each showing overwritten oscillation periods of a plurality of nuclear instrumentation signals.
Figure 7B:
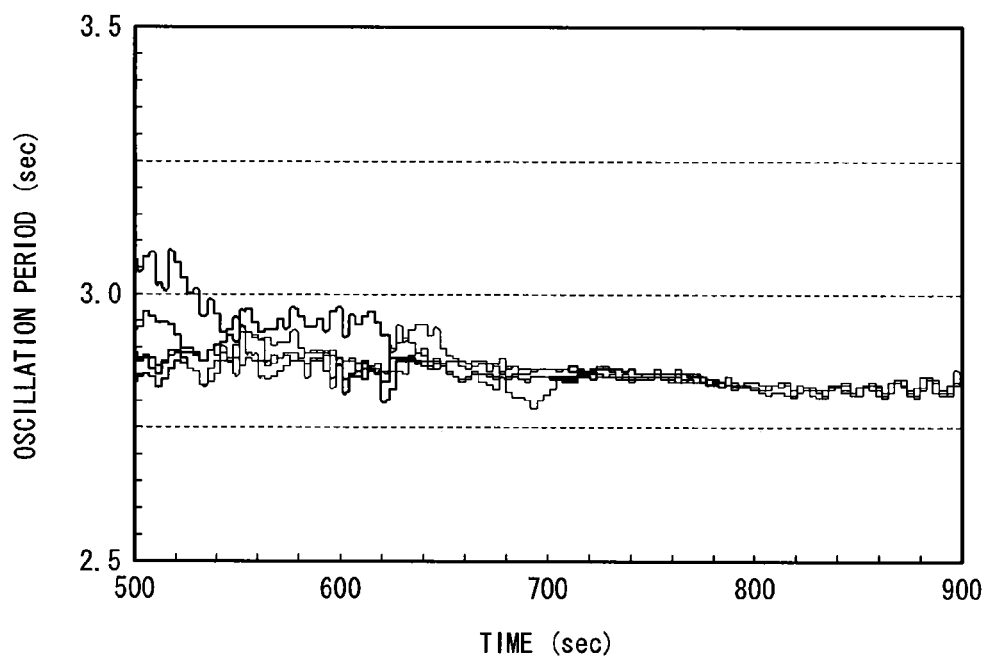

FIG. 7(A) shows a response example of each oscillation period $T_i(t)$ calculated in the first calculation unit 42 based on a plurality of nuclear instrumentation signals S indicating a stable state, while FIG. 7(B) is a response example in the process of shifting to an unstable state. Although FIG. 7(A) and FIG. 7(B) are separately presented as upper and lower drawings, they show a consecutive result.

The drawings indicate that in the stable state, variations in respective oscillation periods over time and variations among signals are both notable, whereas in the unstable states, both of these variations are small.

In the variation analysis unit 49 (FIGS. 2 and 6), a variation (standard deviation) $\sigma_T(t)$ of the oscillation periods in a group is calculated. It is to be noted that those having a top bar within a reference sign 49 of FIG. 6 represent an average value of the oscillation periods at a target time interval (represented by t) in a group.

Figure 8:
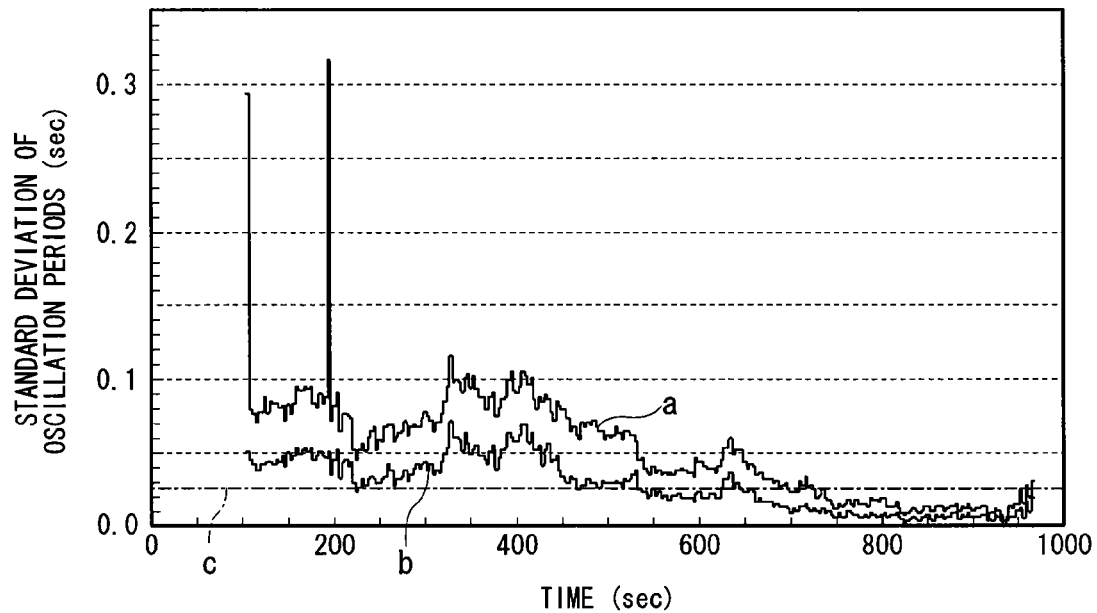
FIG. 8 is a graph view showing a standard deviation of oscillation periods in all the nuclear instrumentation signals and a standard deviation of the oscillation periods excluding outliers.

FIG. 8 shows a response of a standard deviation $\sigma_T(t)$ of the oscillation periods of FIG. 7. As shown in the drawing, the standard deviation value falls at the point past 450 sec and converges into a constant value at the point around 750 sec where oscillation has sufficiently grown.

This is considered because the nuclear thermal hydraulic stability depends on instability of respective fuel channels and on dynamic instability represented by density wave oscillation.

In short, pass time of a two-phase flow is different in every fuel channel due to difference in a two-phase flow dynamic state, and the resonance frequency of density wave oscillation is typically intricate and different in every fuel channel. However, it is considered that a nonlinear frequency locking occurs in the process of macroscopic growth of an instability phenomenon over the entire reactor core through dynamic characteristics of neutron, and thereby the oscillation period of every fuel channel is locked to the oscillation period peculiar to the macroscopic instability.

Accordingly, in the process of the macroscopic growth of the instability phenomenon, variations in the oscillation period decrease. As a result, the effectiveness of using the oscillation period variation as a parameter for monitoring the nuclear thermal hydraulic instability can be recognized.

Figure 9:
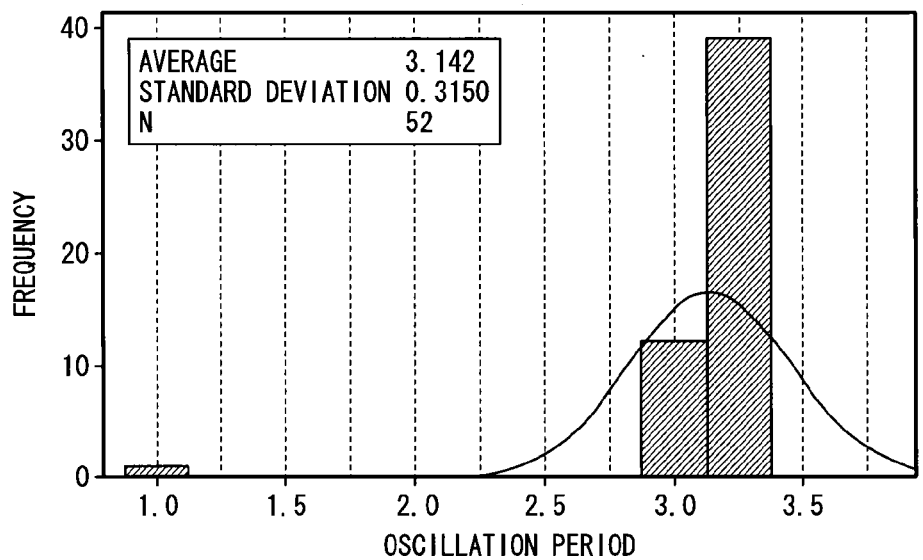
FIG. 9 is a graph view showing a frequency distribution of oscillation periods.

Note that discontinuous values which appear at the points around 100 sec and 200 sec in graph a of FIG. 8 are attributed to the existence of outliers shown in FIG. 9. When a sufficient number of nuclear instrumentation signals S are included in a group, the standard deviation has robustness against such outliers. However, since an average value and a variance (standard deviation) are not robust statistic values in their nature, it is necessary to remove such outliers at the time of calculating monitoring parameters.

Such outliers may be removed by, for example, a method for calculating a standard deviation first and then removing an oscillation period portion which is out of an average oscillation period value by a constant-fold value of the standard deviation. More specifically, a standard deviation is calculated anew by using C as a constant and using only the oscillation period data in the range of the left formula of reference sign 49 in FIG. 6. The resulting standard deviation is use as a monitoring parameter.

Graph line b shown in FIG. 8 represents a response in the case where C=1 and discontinuous response portions caused by outliers are removed. The value of C is set after comparison with other stability parameters such as the decay ratio was conducted and considered.

The outliers may be generated due to failure of measurement systems or insufficient adjustment of ranges. In that case, the nuclear instrumentation signals S can be subjected to range check in advance and thereby removed from a monitoring group. In that case, the nuclear instrumentation signals S would be in the removed state until the failure or insufficient adjustment are eliminated.

Apart from such a case, there is another case in which an outlier is calculated in the process of a statistical processing operation. In this case, the nuclear instrumentation signal S corresponding to the outlier is automatically excluded from the monitor group only at the point when the outlier is calculated. Once the outlier is no longer calculated, the pertinent nuclear instrumentation signal S would be put in the monitoring group again.

A sampling period for converting the nuclear instrumentation signal S into digital time series data $X_t$ is 25 msec. The sampling period is defined as a first reference value c obtained when the oscillation periods of the nuclear instrumentation signals S are aligned due to stability deterioration. The first reference value c is shown with a dashed dotted line in FIG. 8.

Referring to the response of graph line b which was subjected to correction of the standard deviation outliers in FIG. 8, graph line b once goes below the first reference value c at the point around 225 sec and immediately goes above the 25-msec line, and then again goes below at the point around 470 sec and again immediately goes above the line in the same manner.

Graph line b then goes below the first reference value c at the point around 540 sec. After this point, graph line b goes above the line at the point around 625 sec and keeps the state for about 25 sec, but immediately falls at the point past 650 sec and ends up to be a small value of 10 msec or less.

It is at the point around 640 sec that the decay ratio actually starts to show rapid increase, and it is also at that point that a notable oscillation component is observed in the nuclear instrumentation signals S. Therefore, it is considered to be reasonable that the first determination unit 44 determines the stability deterioration of the nuclear instrumentation signals S and shifts to the peak detection mode at the point past around 600 sec.

However, in order to remove those outliers which accidentally reach the first reference value c, the determination is not made based on only one deviance. Rather, duration time of deviance is monitored by using the point at which the response falls below the first reference value c as a reference. The mode is changed to the peak detection mode at the moment when the duration time exceeds a specified duration length.

While the duration length also depends on the oscillation period and on the data length used for calculation thereof, the duration length is set at a value which is several times larger than the oscillation period value and the data length value or more. That is, the peak detection mode is changed when graph line b successively goes below the first reference value c several times or more.

For example, if the duration length is set at 5 times, or a time period of 15 sec in FIG. 8, the operation mode is changed to the peak detection mode at the point around 555 sec.

On the other hand, it is also possible to use, as the first stability index, a standard deviation of oscillation periods associated with a decay ratio. This parameter is effective in detection when the power oscillation appears not in the entire reactor core but in some regions as in the case of the regional oscillation for example.

At the point around 450 sec in FIG. 8, though the response of graph b has not yet reached the first reference value c, the variations in the oscillation period are clearly decreasing as compared with the variations before this point.

Figure 10:
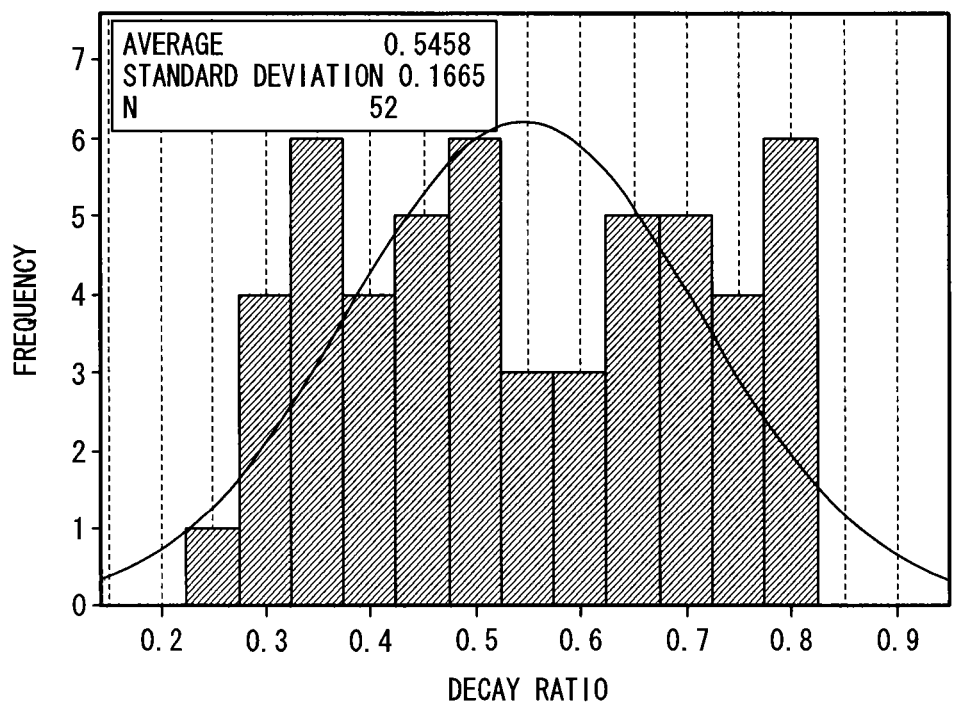
FIG. 10 is a graph view showing a frequency distribution of decay ratios.

FIG. 10 shows a distribution in a decay ratio of the respective nuclear instrumentation signals S at this 450 sec point. A plurality of nuclear instrumentation signals S with a decay ratio of 0.8 are present spatially adjacent to each other. They are considered in the stage prior to development into a regional oscillation.

For example, a start point of instability is defined as the time when a plurality of nuclear instrumentation signals S with a maximum decay ratio or with a decay ratio of 0.8 or more are present. Accordingly, if 30 msec, which is 20% larger than the sampling period, is set as a reference value, then the point of 450 sec is determined as the start point of stability deterioration, and the operation mode can be changed to the peak monitoring mode based thereon.

In the case where stability is recovered after the operation mode has changed to the peak detection mode according to the determination of the stability deterioration by the first determination unit 44, determination to return the mode to the previous oscillation period variation monitoring mode is also needed.

Figure 11:
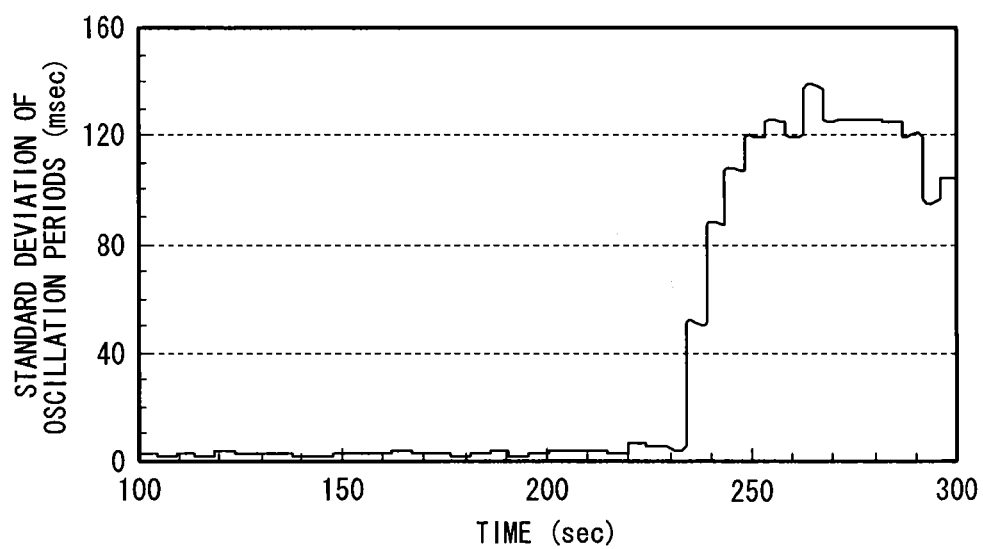
FIG. 11 is a graph view showing a standard deviation of oscillation periods when nuclear thermal hydraulic stability changes from a deteriorated state to a stable state.

FIG. 11 shows a response of a standard deviation of oscillation periods which shifts from the state of stability deterioration with almost no variation to the state of increase in variations with recovery of stability. In short, in this graph line, a section after 230 sec corresponds to the recovered state of stability.

Since the sampling period is 80 msec and the standard deviation of oscillation periods before the point of 230 sec is one digit smaller than the standard deviation after that point, it is indicated that the developed power oscillation is present in the section before the point of 230 sec.

After execution of the operation for suppressing the power oscillation, the standard deviation of oscillation periods rapidly increases, exceeds the sampling period of 80 msec at the point around 240 sec, and then shifts to values in the range of about 100 to 140 msec.

Figure 12:
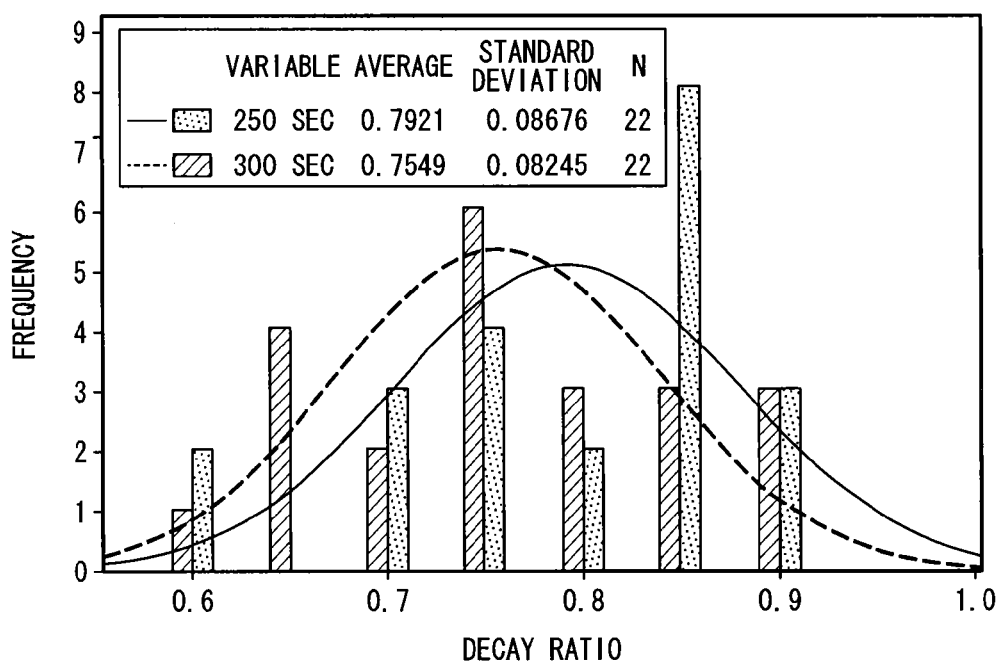
FIG. 12 is a graph view showing a frequency distribution of decay ratios in a time zone from 250 sec to 300 sec of FIG. 11.

FIG. 12 shows a distribution in a decay ratio of respective nuclear instrumentation signals S at the points around 250 sec and 300 sec of FIG. 11. According to the distribution, a plurality of signals with a decay ratio of 0.8 or more remain, indicating insufficient stability. More specifically, if the sampling period, which is on a level with the criterion for judging the stability deterioration, is set as a criterion for judging the recovery of stability, there is a high probability that the system becomes anti-conservative on the aspect of safety.

Therefore, a larger (severe) value is to be used for the criterion for judging the recovery of stability as compared to the criterion for judging the stability deterioration. For example, if the criterion for determining the recovery of stability using the standard deviation is set at a value 1.5 times the sampling period, and a duration time is set at a value 10 times the period, then the safety recovery criterion would not be reached throughout the example of FIG. 11.

A description is now given of the grouping unit 41.

In the ABWR, there are total 208 nuclear instrumentation signals S (LPRM signals). For monitoring the oscillation period variations, it is desirable to group the nuclear instrumentation detectors 31b (FIG. 1), which are in the level B, the highest level in average value of signals among four levels. This is because phase difference appears in oscillation among detectors different in shaft direction level from each other and also because power oscillation tends to occur when a lower power distribution is high, for example.

It is possible to prepare a group which includes all of these nuclear instrumentation signals S (LPRM signals), and it is also possible to use any one of the APRM signals which are grouped into eight groups.

However, when the APRM signals are used, oscillations expected to be detected by the group are core-wide oscillations. In this case, it is considered that there is no substantial difference from the general APRM monitoring. In other cases, it may be necessary to employ operation methods such as selecting channels including no outliers and damaged detectors and switching channels in the middle of operation.

Since occurrence of regional oscillations is greatly influenced by lower distortion in the power distribution, it is effective, for determining the oscillation mode based on the phase difference, to select detectors out of four detectors 31a, 31b, 31c, and 31d (FIG. 1) and to make a group of the same level, that is, a group of either level A or level B.

Reactor core management is conducted by targeting ¼ pattern as shown in FIGS. 13(A), 13(B), 13(C) and 13(D). The higher order space mode distribution generally corresponds to any one of these four patterns. Therefore, eight groups divided by these four patterns are prepared for regional oscillation monitoring.

Based on the higher order space mode distribution obtained in the state estimation unit 60, a necessary number of the nuclear instrumentation signals S for use are selected within respective groups in descending order of the higher order space mode distribution. When there is no higher order mode distribution, signals may be selected in descending order of the power distribution, or selected, for example, from predetermined fixed locations, such as two signals from an outermost periphery portion and three signals from an inner side thereof.

Figure 14:
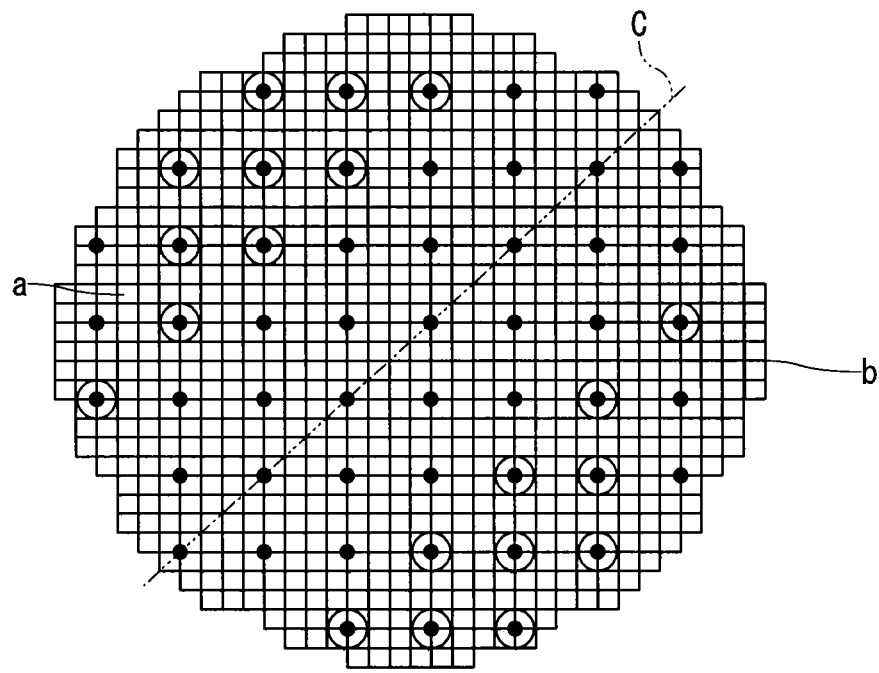
FIG. 14 is a view showing grouping for regional oscillation monitoring.

FIG. 14 shows the case where ten signals allocated to respective groups. In this case, ten detectors (detectors encircled in the drawing) nearest to a node with a higher higher-order space mode value are selected in the respective group region.

Figure 13A:
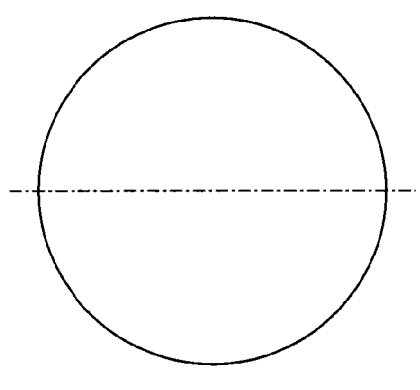
FIG. 13A, FIG. 13B, FIG. 13C and FIG. 13D are views each showing a pattern of an oscillation center line in a regional oscillation.
Figure 13B:
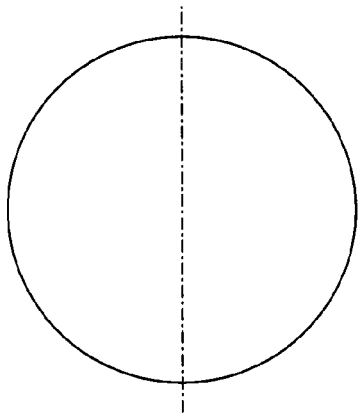
Figure 13C:
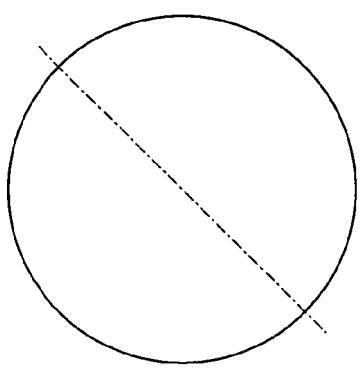
Figure 13D:
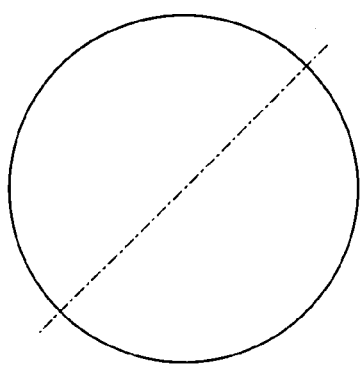

The pattern of FIG. 14 is equivalent to the pattern of FIG. 13(D). As for the pattern of FIG. 13(C) which is orthogonal to the pattern of FIG. 14, two groups each having ten signals allotted thereto are also prepared.

If the patterns of FIGS. 13(C) and 13(D) are predicted in higher order mode distribution prediction, it is not necessary to take the trouble of preparing the patterns of FIGS. 13(A) and 13(B). In this case, four groups would be selected for monitoring regional oscillations.

Next, a group for local oscillation monitoring is set.

Local oscillations tend to occur in a fuel channel which is thermally severest. Accordingly, the detectors are selected and observed which are nearest to the fuels, which are obtained by the state estimation unit 60 as the fuels having the severest radial power distribution, and to the fuels which are severe in terms of a gross power distribution including effects of an axial power distribution as well as the effects of the radial power distribution.

When the detectors selected based on these two power distributions are different, two different groups may be prepared, or either the fuels severe in fuel soundness or the fuels severer in the higher order space mode distribution are appropriately selected and grouped as one group.

Figure 15:
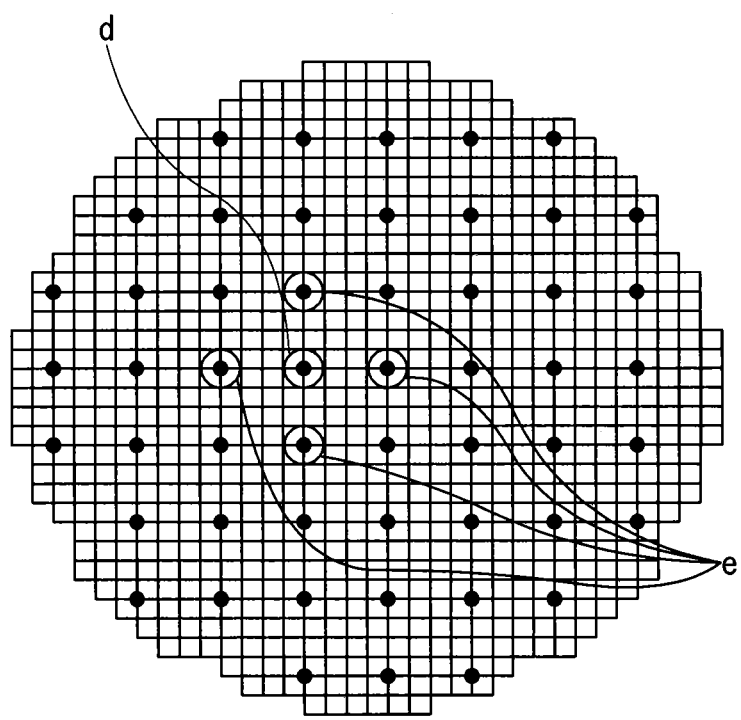
FIG. 15 is a view showing grouping for local oscillation monitoring.

As shown in FIG. 15, when the position of a detector d is selected as the fuels for local oscillation monitoring, four detectors e which are most adjacent to the detector d are selected, and five detectors composed of these four detectors and the detector d are grouped.

In this case, stability indexes (oscillation period, decay ratio, and amplitude) are independently calculated from the detector d, while standard deviations of these stability indexes of five signals are calculated and used as local oscillation monitoring signals. Further, there is also a method in which one detector in the regional oscillation monitor group of FIG. 14, which is nearest to the peak of the higher order mode distribution, is independently set in the group for local oscillation monitoring.

The methods described so far are the methods in which the detectors adjacent to the fuel assembly that is a monitoring object are prefixed based on the predicted power distribution and higher order mode distribution, and local oscillations are monitored based on the signals from the detectors.

Aside from the methods disclosed, a method for sequentially selecting monitoring signals from the group used for core-wide oscillation monitoring may also be considered. In this method, among respective signal responses coming from the detectors which constitute the group, a signal representing the maximum value of the decay ratios or the amplitude is selected as a local oscillation monitoring signal.

Figure 16A:
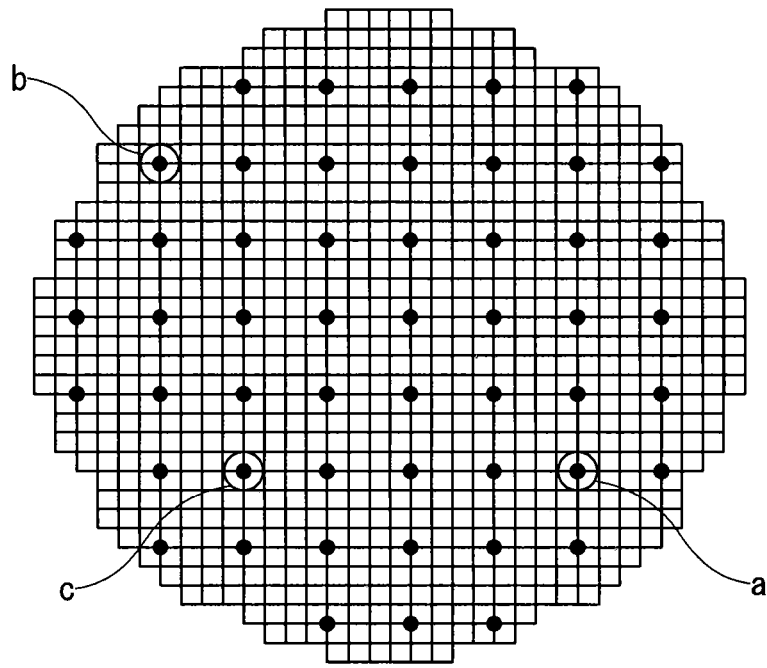
FIG. 16A and FIG. 16B are explanatory views each showing changes in position of a detector which indicates a maximum decay ratio at the time of regional oscillation.
Figure 16B:
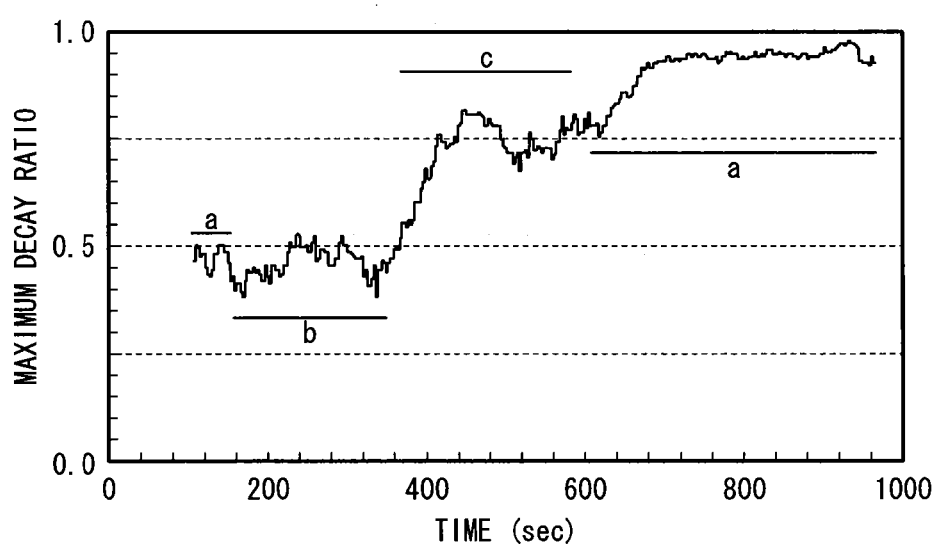

FIGS. 16(A) and 16(B) shows transition of the maximum decay ratio of the original nuclear instrumentation signals S used in FIG. 7. In the time period of about 1000 sec, the detector which gains the maximum decay ratio is changed over four areas: a->b->c->a.

Of these detectors, the detector having the maximum decay ratio in area a is a detector a located on the lower right side of the reactor core. In area b, the maximum detector shifts to a detector b located at a position symmetrical to the detector a on the reactor core, and then shifts to a detector c in area c, before returning to the detector a in area a.

Thus, the signal having the maximum decay ratio is defined as the nuclear instrumentation signal S determined to be most unstable and is used as a signal for local oscillation monitoring. However, since it is inadequate to frequently change the monitoring signal, signal change is conducted when the decay ratio of the monitoring signal shows a rapid fall or when the signal has a larger decay ratio for a time period several times longer than the oscillation period. The monitoring signal is fixed once the monitoring mode is changed to the peak detection mode.

As shown in FIG. 3(A), the regional oscillation is an oscillation caused by deterioration of the space higher order mode of neutron fluxes. As a consequence, the distribution of the oscillation mode in the reactor core, i.e., the distribution of the phase difference in oscillation is similar to the higher order space mode distribution.

Accordingly, a prediction function for predicting the power distribution and the neutron flux higher-order space mode in the operating state where the reactor core tends to be destabilized is additionally provided for effective monitoring of the regional oscillations.

FIG. 2 shows the estimation unit 60 configured to estimate the power distribution and the neutron flux higher-order space mode. The process calculator 61 estimates plant parameters based on a nuclear thermal hydraulic physical model, while loading plant data. With use of the nuclear thermal hydraulic simulator 63 in the process calculator 61, the power distribution or the higher order mode distribution under operating conditions of stability deterioration is calculated.

The operating conditions of stability deterioration are low flow-rate and high power conditions after pump trip. Such conditions are obtained in advance by conducting analysis in every operating cycle.

In the case where the nuclear thermal hydraulic simulator 63 does not have a function for calculating the higher order mode distribution, distributions calculated off-line in advance corresponding to control rod patterns, burn-up and the like are stored in the data base 62, and the distributions stored in the data base are interpolated/extrapolated to calculate distributions under operating conditions.

The thus-obtained power distributions or higher order mode distributions are used by the grouping unit 41 to set signal groups for monitoring the regional oscillation or the local oscillation.

A description is now given of determination of the regional stability by grouping.

Figure 17:
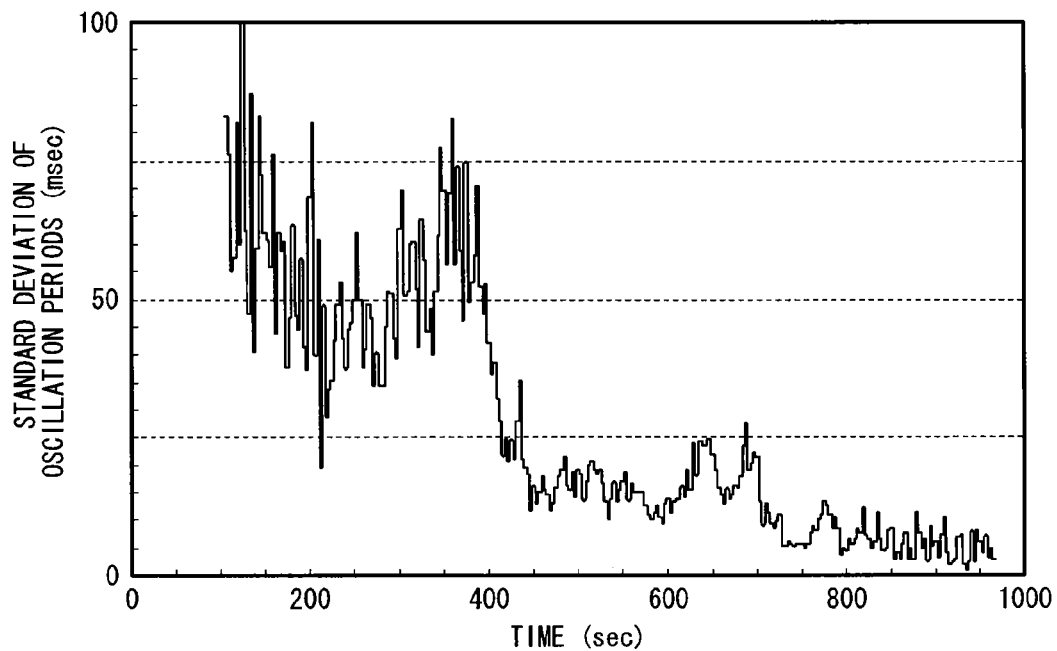
FIG. 17 is a graph view showing a standard deviation of oscillation periods of regional oscillation monitoring groups.

FIG. 17 shows a standard deviation of the oscillation periods calculated in a group, which is made to include top ten signals in the higher order mode distribution as shown in FIG. 14 with use of the pattern of FIG. 13(C). Contrary to this, in FIG. 8 shown before, an average group of the entire reactor core is used.

At the point around 450 sec of FIG. 17, the standard deviation of the oscillation periods is lower than 25 msec or a sampling period of the time series data. This value corresponds to a value 1.2 times larger than the criterion for determining stability deterioration in FIG. 8.

This group includes the signals having the highest decay ratio in area c in FIG. 16, and corresponds to the determination of stability deterioration on the criterion of a maximum decay ratio of 0.8.

Now, a specific example will be shown with respect to the peak detection mode.

After stability deterioration is determined by monitoring of the standard deviation of the oscillation periods, it is necessary to promptly change the operating mode to the peak detection mode, which is capable of detecting growth of power oscillations in order to also avoid degradation in fuel and plant soundness due to power oscillations.

In the state where stability has been deteriorated to some extent, it is considered that oscillation components which affect nuclear thermal hydraulic stability are more prominent than noise components.

Accordingly, by fitting the prominent oscillation component into a polynomial capable of analyzing the components, peaks can be detect in an analytical manner. In this case, the necessary data length is smaller than that in the statistical method, so that higher response speed can also be provided.

However, if fitting is performed by using the entire data length, fitting does not succeed in the case of relatively low-order functions. If functions are too complicated, they cause excessive data dependency and disturb robust fitting.

Accordingly, piecewise polynomial approximation is employed which divides and fits time series data.

A representative example thereof is spline functions, among which the most commonly-used cubic spline interpolation is used to approximate subintervals with cubic polynomials. More specifically, time of the time series data is divided into intervals of $t_n \leq t \leq t_{n+1}$, and these intervals are interpolated with the following cubic:

$$S_n(t) = a_n + b_n(t-t_n) + c_n(t-t_n)^2 + d_n(t-t_n)^3$$

Thus, by fitting the time series data into the polynomial, a derivative can easily be obtained in an analytical manner. If the time when the derivative is equal to zero is obtained, the time is equivalent to the time when a peak (top or bottom) of an oscillation appears.

$$dS_n(t)/dt = b_n + 2c_n(t-t_n) + 3d_n(t-t_n)^2$$

Figure 18:
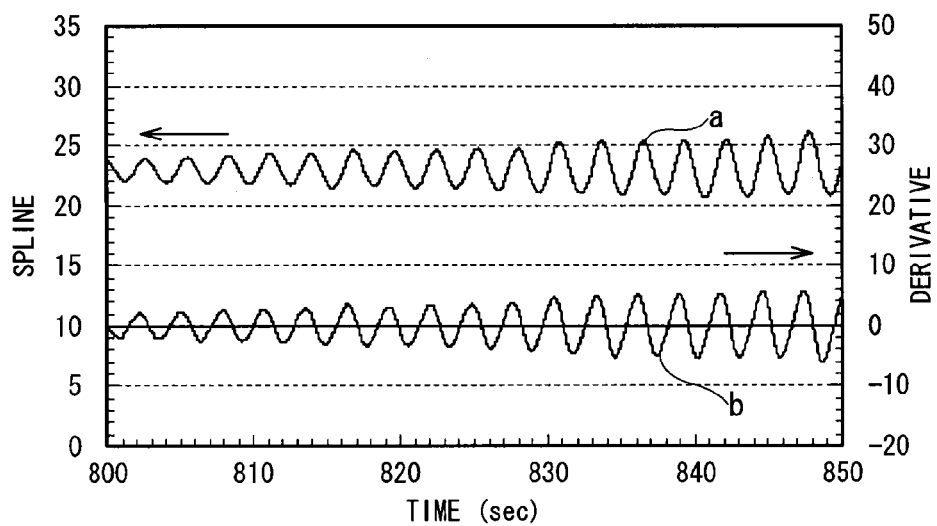
FIG. 18 is a graph view showing comparison between spline-fit time series data and its derivatives.

FIG. 18 shows comparison between spline function a and derivative b obtained by differentiating the spline function a.

Herein, the sampling interval of the time series data is used for spline interpolation data intervals. More specifically, the sampling intervals are interpolated by $t_{n+1} = t_n + \Delta t$ where $\Delta t$ represents a sampling period.

With respect to the method for searching the time when derivative b is equal to zero, it is often difficult to stably obtain the root of the quadratic since the differential of the cubic spline function is a quadratic function. Accordingly, the following procedures are used.

First, an interval where a value obtained by multiplying adjacent derivatives is negative is searched. Since the derivative at endpoints of the interval $[t_n, t_{n+1}]$ is equivalent to a coefficient in a primary term of spline function a, they are respectively equal to $[b_n, b_{n+1}]$.

In order to remove minute variations in estimated error of the derivatives, it is necessary to filter the time series data with a low pass filter. Once the interval where the derivative is equal to zero is estimated, the interval is then further divided and a derivative is obtained therein. A point where an absolute value of the derivative is the minimum is defined as the zero point. By inputting the time corresponding to this zero point into the spline function, a peak value can be obtained.

Figure 19:
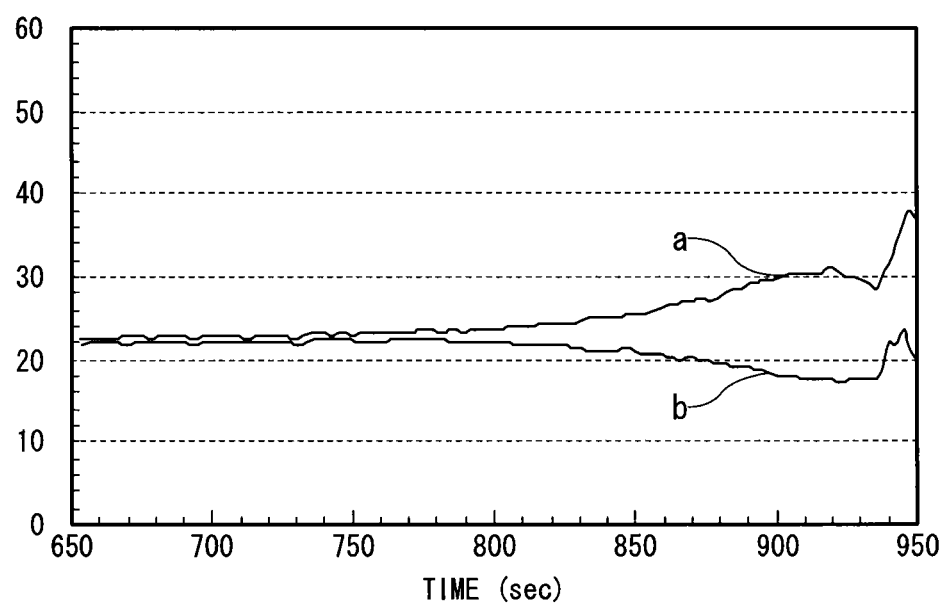
FIG. 19 is a graph view showing loci of an upper peak value and a lower peak value detected by a peak detection method.

FIG. 19 is a graph view formed by connecting peaks extracted using this method.

The above procedures will be shown in the form of formulas. An interval $[t_n, t_{n+1}]$ which satisfies $b_n * b_{n+1} \leq 0$ is obtained based on linear coefficients $b_n$ and $b_{n+1}$ in spline functions of adjacent intervals.

In other words, there is a point where the derivative is equal to zero, i.e., a peak of oscillation, in this interval. Therefore, the interval is further divided. That is, the interval $[t_n, t_{n+1}]$ is divided at equal intervals into N subintervals.

Points between these subintervals are defined as $[t_n, t_n + \Delta t/N, t_n + 2\Delta t/N \ldots t_{n+1}] = [t^0{}_n, t^1{}_n, t^m{}_n, \ldots t^N{}_n]$, and the divided time is each substituted therein to obtain a derivative. Then, a dividing point where the derivative is most approximate to 0, i.e., where an absolute value thereof is the minimum, is obtained.

More specifically, when m is varied from 0 to N, $m = m_{min}$ which gains a smallest value of $|dSn(t^m{}_n)/dt|$ is obtained. As a result, $t_n(m_{min}) = t_n + m_{min} \Delta t/N$ makes the position of the peak, and therefore this time is substituted to have a peak value of $S_n(t_n(m_{min}))$.

The peak is either a maximum value (top) or a minimum value (bottom). If the peak is the top, for example, then the next peak searched in the same technique ends up the bottom, and further the next peak will be the top. If the time at which the peak appears is defined as $t_k(m_{min})$, time difference $t_k(m_{min}) - t_n(m_{min})$ makes an oscillation period. Since the difference between the top and the bottom makes an amplitude, a ratio between the present amplitude and the amplitude in one period previous makes a decay ratio.

Thus, peak detection is repeated until a peak is detected, and once the peak is detected, the detected peak is used as an origin to detect the next peak. The procedures are repeated afterward. It is to be noted that an initial origin is the point of time when the variation monitoring mode is changed to the peak detection mode.

An operation flow of the peak detection method will be explained with reference to FIG. 20.

When the peak detection method is activated by mode change (S51), the mode change point is set as an origin (S52), and oscillation period T derived by the variation monitoring method before the mode change is used (S53) to set a range T/2 which is half the oscillation period T as the range T/2 has a high probability of including the next peak (S54). The time series data is passed through a low pass filter and then sequentially loaded (S55, S56). As a result, minute fluctuation components with a frequency larger than the frequency of the target nuclear thermal hydraulic stability (inverse of oscillation period) are removed.

During a half period (with a certain amount of margin e added thereto) from the origin of peak search, cubic spline interpolation is performed with a sampling period as an interval width (S57). A spline factor $b_n$ in a secondary term is obtained, and an interval where a product $b_n * b_{n+1}$ between $b_n$ and adjacent coefficient $b_{n+1}$ is equal to zero or less is searched (S58).

Once the interval is found, then the interval is further divided into N subintervals. That is, the sampling period $\Delta t$ is further divided by $\Delta t/N$ to obtain divided time (S59). Then, a derivative at each of the divided time is obtained, and a dividing point where an absolute value of the derivative is the minimum is searched (S60).

The point $t_n{}^{min}$ makes a peak position, and a peak value $S_n(t_n{}^{min})$ derived by substituting the point into the original spline function is stored (S61, S62).

Once the peak point is found in this way, an endpoint $t_{n+1}$ of the interval including the peak point is used as a new origin to find the next peak in a similar way (S61->S52).

Based on the stored position of adjacent peaks and peak values, an amplitude, a period, and a decay ratio relating to the second stability index are estimated (S63). Since peaks are searched as tops and bottoms in turns, the amplitude is obtained by subtracting a bottom value from a top value, whereas the period is obtained as a difference between peaks composed of the top and the next top or the bottom and the next bottom. The decay ratio is obtained by dividing the amplitude of a rear peak in a set of adjacent peaks by the amplitude of a front peak.

The parameters monitored by the peak detection method are the amplitude or maximum values of peaks, and the decay ratio. That is, in this stage, the stability has already been deteriorated to some extent, and oscillation components other than noise components are dominant in the output response. It is considered therefore that it is highly probable that the peaks are responses based on the power oscillation, while it is unlikely that the peaks are accidental one.

There are a plurality of peaks to be monitored, such as average peaks in the group for monitoring average responses, average peaks in the group for monitoring regional oscillations based on the higher order mode, and unaveraged peaks for monitoring local oscillations.

Since the behavior of these peaks is different depending on the types of power oscillations, the judgmental criterion for activating oscillation suppression devices is also different.

Figure 21:
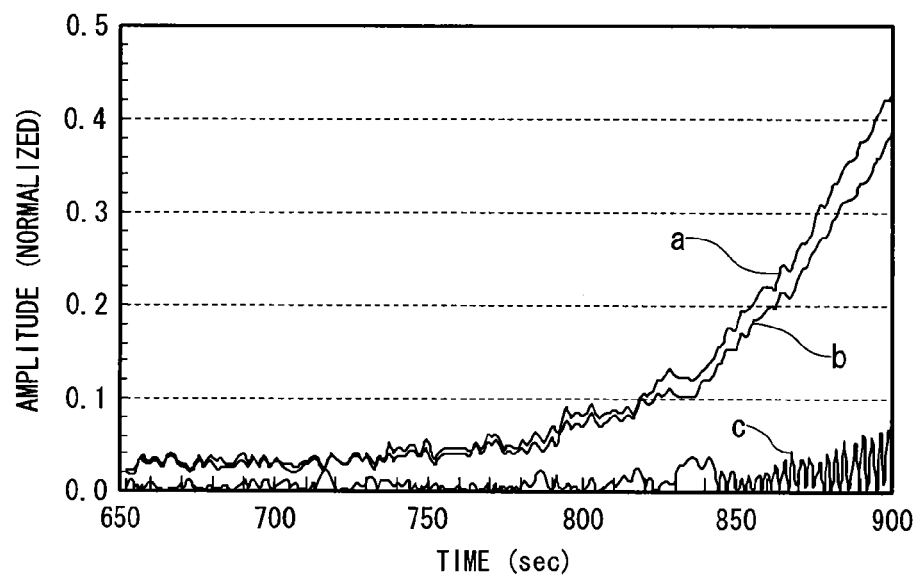
FIG. 21 is a graph view showing amplitudes detected by the peak detection method.
Figure 22:
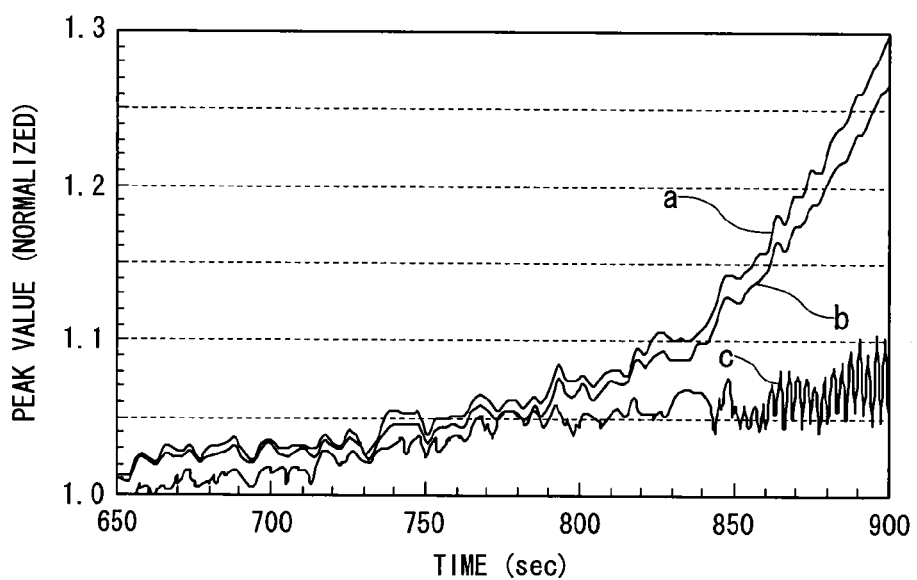
FIG. 22 is a graph view showing peak values detected by the peak detection method.

FIG. 21 shows an amplitude response, and FIG. 22 shows a peak (top) response. Both the responses are normalized with signal values at the time when the monitoring mode is changed.

Graph a of FIG. 21 and graph a of FIG. 22 represent each a response extracted from signals for local oscillation monitoring, graph b of FIG. 21 and graph b of FIG. 22 represent each a response extracted from ten average signals grouped for local oscillation monitoring in area b of FIG. 14, and graph c of FIG. 21 and graph c of FIG. 22 represent each a response extracted from average signals in the entire reactor core.

Both in FIGS. 21 and 22, the peak response of the signal for local oscillation monitoring is fastest, followed by the peak of the signal for regional oscillation monitoring with slight delay, and the peak of the average signal follows with large delay.

This is a natural consequence of the targeted power oscillation being the regional oscillation. The judgmental criterion for outputting a trip signal, which activates power oscillation suppression operation, is different depending on such differences as difference in signal characteristics, difference in characteristics of the power oscillation mode, and difference in impact of these differences on the entire plant.

In other words, the reference value for outputting the trip signal is set to be small for the average signals which have the lowest sensibility and large impact on the entire plant, and is set to be large for the signals for local oscillation monitoring.

For example, if the reference value of amplitude is set as 30% of the amplitude of the local oscillation signal, 20% of the amplitude of the regional oscillation monitoring signal, and 10% of the amplitude of the average signal, then the trip signal is to be outputted at the point around 860 sec when the amplitude of the regional oscillation signal reaches 20% in FIG. 21.

If the reference value of the peak value is set as half of the amplitude, then the average signal reaches the reference value fastest and outputs the trip signal at the point around 770 sec in FIG. 22. In this power oscillation example, average power slowly goes up (there is a trend of low-frequency components), so that the trip signal is outputted fastest on the basis of the average value signal in the case of determination according to the peak value.

Figure 20:
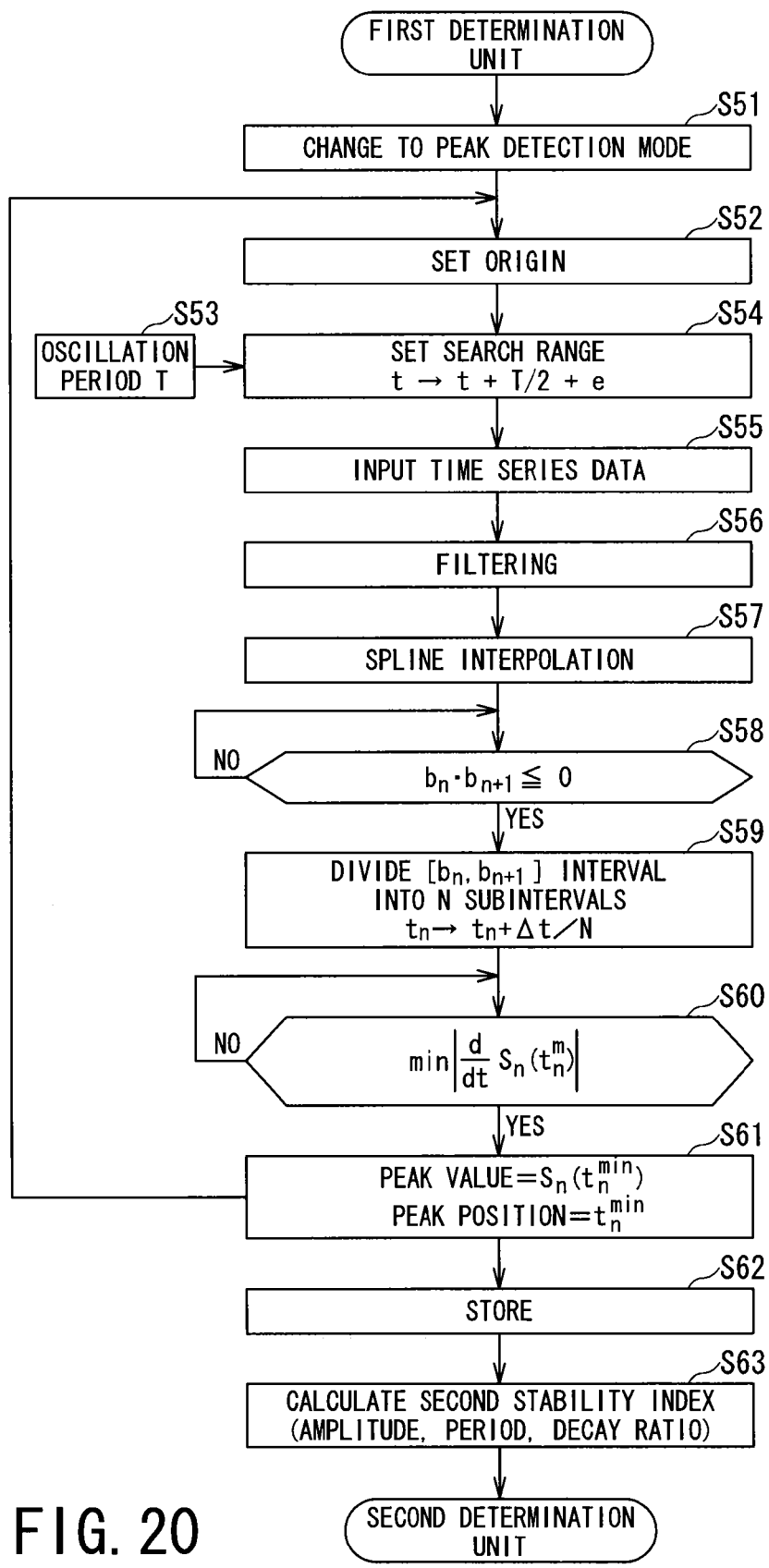
FIG. 20 is an explanatory view showing an operation flow of the peak detection method.

In order to avoid power delay in the trip signal based on spline interpolation processing (FIG. 20: S57), the trip signal is set to be outputted if the value of a signal (average signal of each group and individual signal for local oscillation monitoring) which passed the low pass filter exceeds a predetermined value in spite of the trip determination not made by the peak detection method.

For example, the predetermined value is 50% larger than a trip set value based on the peak value, or 15% of the trip set value based on the signal for regional oscillation monitoring.

Thus, when trip determination is made without using the peak detection method, the stability of power has already been considerably deteriorated (e.g., a decay ratio of 0.8 or more). Accordingly, a possibility of rapidly grown power oscillation is higher than a possibility of accidental peaks. Therefore, the trip determination in this case is effective as a backup function.

Figure 23:
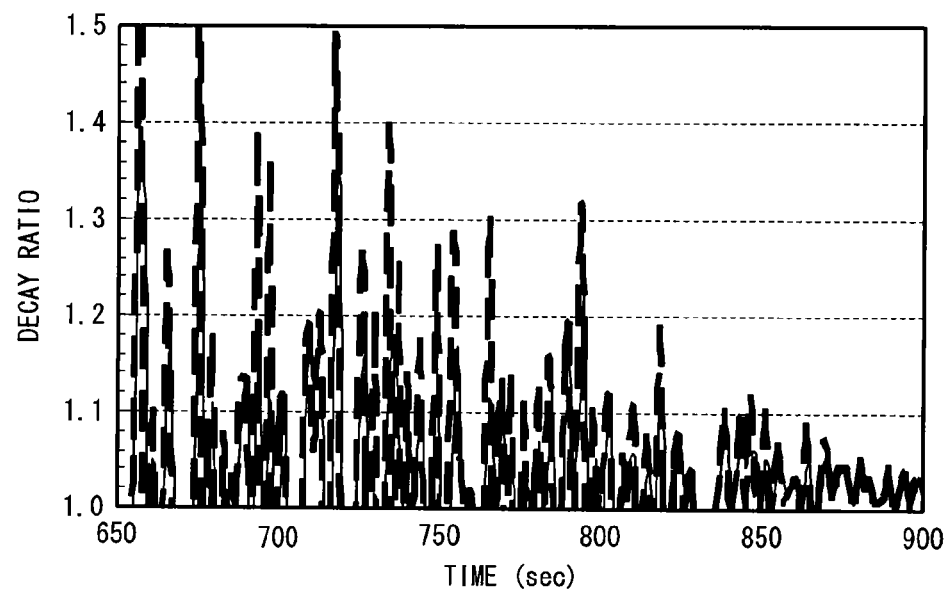
FIG. 23 is a graph view showing decay ratios detected by the peak detection method.

FIG. 23 shows a response example of the decay ratio obtained from the peak amplitude of the signal for regional oscillation monitoring.

In the state where the amplitude is small, increase and decrease in the amplitude alternately occur between adjacent peaks like a bead, so that the decay ratio has large momentary fluctuation. The signal in this state is not appropriate as a monitoring signal. However, the decay ratio is effective as an index to determine whether or not rapid growth of oscillation is occurring.

In the case of the response including alternate increase and decrease in the amplitude, a method using an average value of two decay ratios is effective. In order to avoid abnormal decay ratios in a small amplitude, it is recommended to enable this decay ratio monitoring when a value smaller than the trip set value based on the amplitude, e.g., ¼ of the trip set value, is exceeded.

In this case, the trip based on the decay ratio is enabled when 5% of the amplitude is exceeded in FIG. 21, that is, the trip is enabled at the point around 780 sec. This makes it possible to avoid the trip being enabled before this point by an unusually large decay ratio in FIG. 23.

If the trip determination value based on the decay ratio in the case of being determined by one amplitude ratio is set at 1.3, and the trip determination value based on the decay ratio in the case of being determined by average of two amplitude ratios is set at 1.2, then the trip is enabled at the point around 800 sec. The determination criterion for enabling the decay ratio-based trip needs to be set at a value which is higher, with a sufficient margin, than a regular noise level amplitude or several %.

Even when any one of the trip determination criteria is not reached in the above power oscillation monitoring by the peak detection, it can still be judged that there is a high probability of occurrence of the nuclear thermal hydraulic oscillation if the variations, monitored in the oscillation period variation monitoring executed concurrently with the peak detection method, converge into a small value.

In this case, although the peak detection is given high priority, the trip signal is outputted based on the oscillation period variation monitoring. As a result, it becomes possible to suppress power oscillation with higher reliability without compromising fuel soundness and plant soundness.

The standard deviation representing oscillation period variations also depends on the number of signals used for calculation. As the number of signals increases, the value of the standard deviation generally decreases. Accordingly, it is necessary to separately set each set point depending on the number of signals in each group.

For example, FIG. 8 shows the case of the average value signal group, so that the number of signals used is large. Accordingly, around at the point past 700 sec, the standard deviation largely falls and converges to an almost stable value. Contrary to this case, in the regional oscillation monitoring group, the number of target nuclear instrumentation signals S is ⅕ of that in the average value group. According to the definition of the standard deviation, the value is proportional to the square root of the inverse of the number of signals. Therefore, the value is about √5 to 2.24 times larger.

Figure 24:
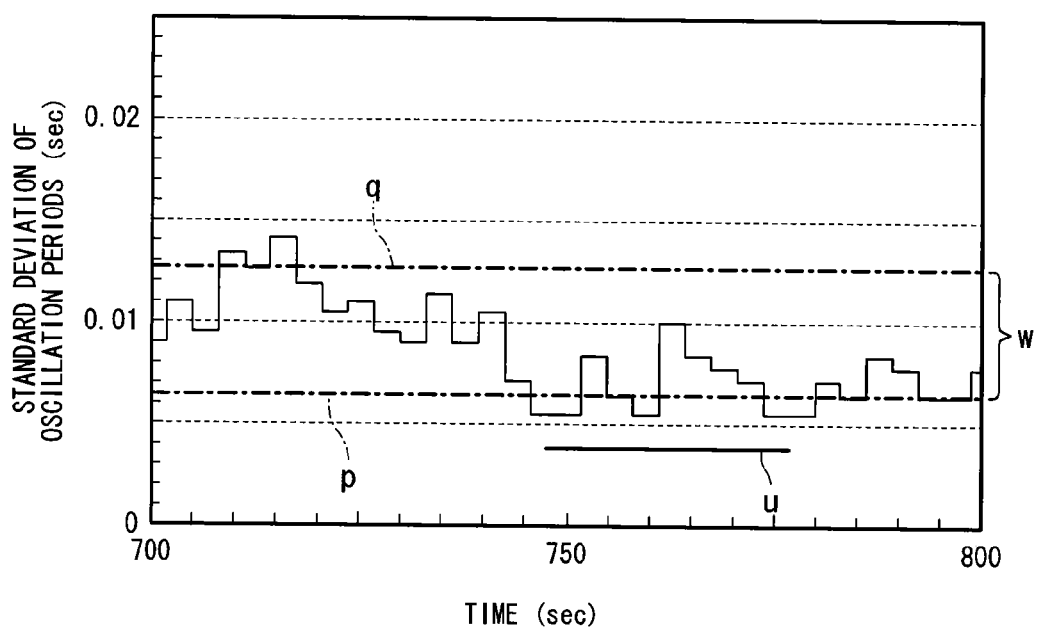
FIG. 24 is an explanatory view showing operation of a third determination unit.

FIG. 24 is an explanatory view showing a method for judging whether to output a trip signal based on a standard deviation of oscillation periods. Line q which defines a reset condition is set at ½ of the criterion for determining mode change, and line p which defines a trip condition is set at ¼ of the criterion for determining the mode change. Thus, as long as the reset condition is set less severely than the trip condition, the values of the lines which define the reset condition and the trip condition are not particularly limited.

The time when the signal goes below line p is used as an origin to start time measurement, and when predetermined duration time K has elapsed, the trip signal is outputted. Even when the signal goes below line p once, the time measurement would be reset if the signal exceeds line q before elapse of duration time u (e.g., 10 times of the oscillation period). This is because a smaller deviation value generally has larger variations.

In FIG. 24, the signal reaches line p that is the determination criterion of ¼ at the point around 746 sec first, but the signal immediately goes above the line. However, the time measurement of duration time u is maintained, and the criterion is continuously satisfied for almost 30 sec or 10 times of the oscillation period. Therefore, the trip signal would eventually be outputted.

Figure 25A:
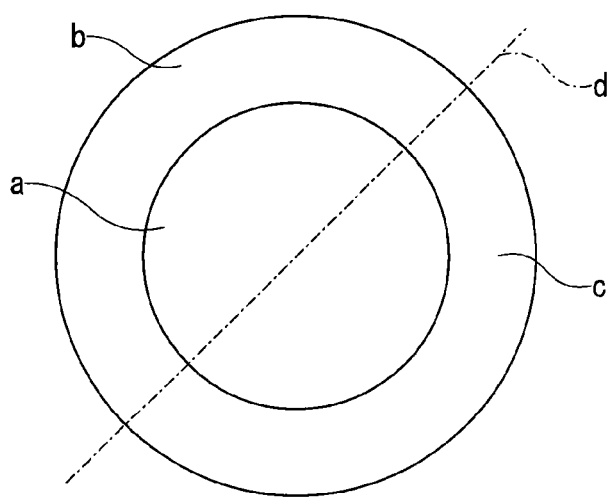
FIG. 25A and FIG. 25B are explanatory views each showing detection of phase difference between respective groups.
Figure 25B:
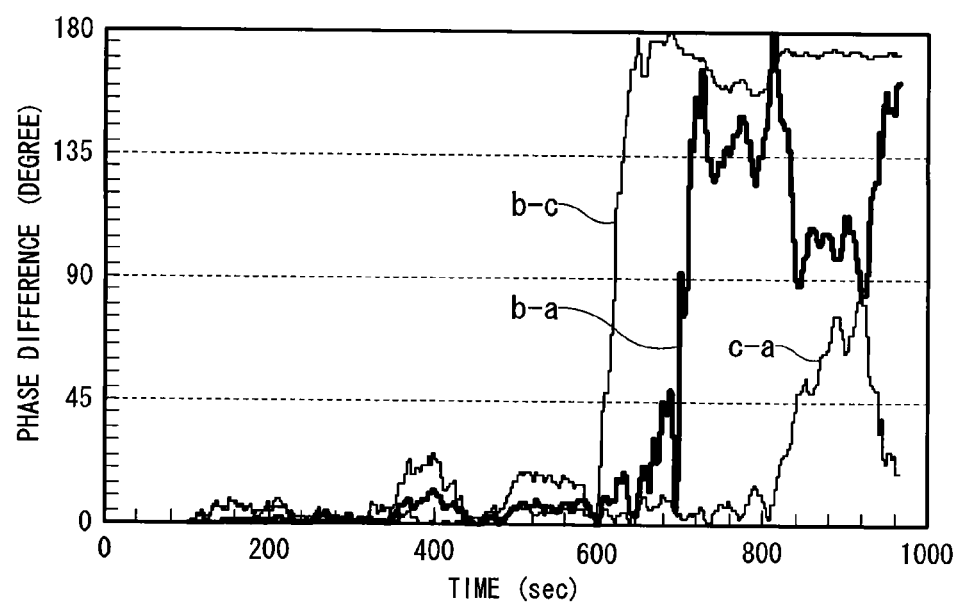

In the reactor core shown in FIG. 25(A), averaged signals of area a, averaged signals of upper area b across diagonal line d, and averaged signals of lower area c across diagonal line d are observed. FIG. 25(B) is a graph view showing phase difference in three combinations of these three areas.

Between the average signals divided by diagonal line d into monitoring groups, the phase difference in oscillation is calculated with use of a statistical method. In the statistical method, when a cross correlation function or a cross spectrum that is spectral representation of the cross correlation function is obtained, phase difference can be calculated based on delay time with which the function value is the maximum in the case of the former. The phase difference can be calculated can also be calculated based on a spectral phase in the case of the latter.

With these parameters, precise information on the power oscillation is obtained, which makes it possible to execute optimal monitoring for the oscillation mode and to enhance the aforementioned determination accuracy.

Graph b-c of FIG. 25(B) represents phase difference between two regional oscillation monitoring signals of area b and area c. The phase difference reaches 180 degrees at the point past 600 sec. It is indicated that a combination of these areas constitutes regional oscillation which oscillates in phases opposite to each other.

Graph b-a represents phase difference between two regional oscillation monitoring signals of area b and area a. Graph c-a represents phase difference between two regional oscillation monitoring signals of area c and area a.

Both graph b-a and graph c-a do not form clear opposite phases. However, since graph b-a has a larger phase difference, it is estimated that an oscillation center line which serves as a node of regional oscillation is out of alignment with the center line d for group division. It is to be noted that all of these phase differences hardly appear in the case of core-wide oscillation.

In the case where signs of regional oscillation has already been observed at the point around 600 sec first, and then the operating mode shifts to the peak detection mode as shown in FIG. 25(B), it is possible to preferentially monitor the average signals which represent area b and area c of FIG. 25(A).

For example, as for trip conditions of the peak detection method, if it is not desirable, in terms of reliability, to activate the oscillation suppression operation by the trip of only one signal out of a plurality of group average signals, then setting is so changed that the operation is activated by generation of two or more trip signals.

In short, the average signals being tripped in both area b and area c are regarded as development of regional oscillation, so that the power oscillation suppression operation may be activated. Alternatively, if the trip conditions of area b and area c are set less severely than the trip conditions of other signals, it becomes possible to ensure that the regional oscillation is suppressed only after these two signals are both tripped.

Thus, if the information on the oscillation mode is acquired by the statistical method in the stage before the activation of the peak detection method, malfunction and operation delay can be minimized based on the information, and thereby optimized trip conditions can be implemented with high reliability.

Although a description has been given of the example in which the present invention is applied to optimization of control on power oscillation suppression operation after determination of stability deterioration, the present invention is also applicable to determination of stability deterioration in a similar manner.

More specifically, if information on the oscillation mode can be acquired at the time of monitoring convergence of oscillation period variations, the average signals for regional oscillation monitoring are preferentially monitored based on the acquired information. If the standard deviation of oscillation periods in the groups of area b and area c decreases in a similar way, it is then judged that the regional stability has been deteriorated. Note that in this case, the judgment of the stability deterioration is concluded only when the criterion for determining the stability deterioration is set less severely and both the standard deviation values satisfy the less-severe determination criterion.

The peak detection mode relating to the group signals in the pertinent area is activated. As a consequence, the trip conditions for the peak detection method in area b and area c in this stage are made slightly less severe than those for other signals.

Figure 26:
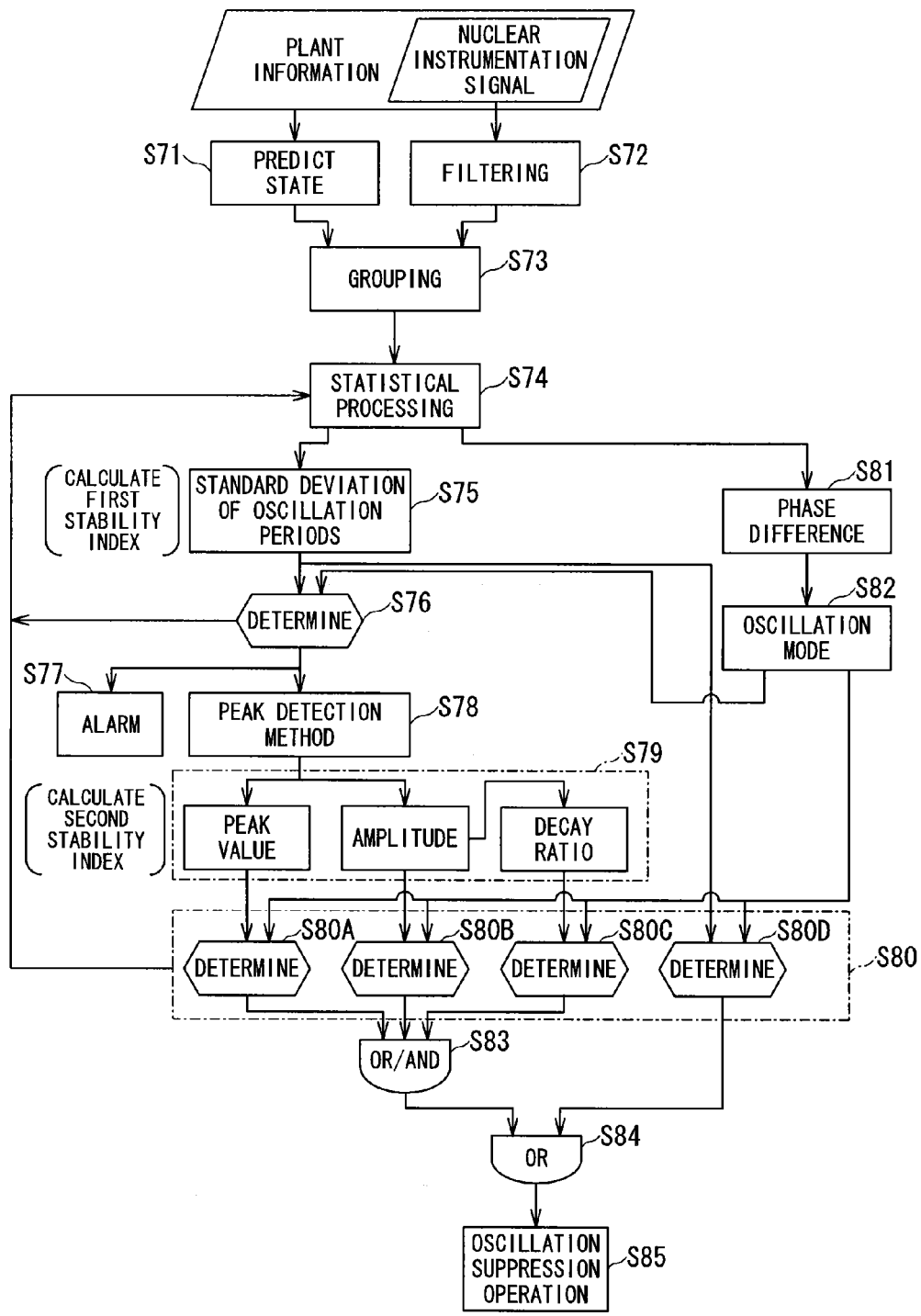
FIG. 26 is a flowchart showing a method for monitoring nuclear reactor power.

FIG. 26 shows an operation flow of the power monitor.

Based on the plant information, an expected state of the stability deterioration is predicted (S71). Based on the power distribution and the higher order mode distribution derived from the result, the nuclear instrumentation signals are grouped (S73).

As plant information, digitized nuclear instrumentation signals S are inputted in sequence and are subjected to appropriate filtering processing (S72) so as to remove fluctuation components whose frequency bands are different from those of the nuclear thermal hydraulic power oscillations.

With use of the signals based on the plant information, grouping is performed (S73), statistical processing is performed on individual signals or averaged signals (S74), and a standard deviation of oscillation periods in each group is outputted (S75). Further, phase difference between group signals is outputted (S81), and the oscillation mode is determined based on the phase difference (S82).

The oscillation mode is first referred in the case of determining instability from the standard deviation of oscillation periods (S76). More specifically, based on the oscillation mode characteristics (core-wide, regional, or local oscillation, the center line thereof in the case of regional oscillation, and the position thereof in the case of local oscillation), the group signals optimum for determining instability are selected.

In the case where instability has already been determined and the peak detection method has been activated (S78), determination of stability is contrarily performed (S76). If the reactor core is determined to be stable, the procedures from the statistical processing (S74) to the processing for calculating the standard deviation of oscillation periods (S75) are repeated.

If instability in the standard deviation of oscillation periods is judged, an alarm is first sounded (S77) and the peak detection method is activated (S78). However, even when the peak detection method is activated, the processing for calculating the standard deviation of oscillation periods is concurrently conducted. In contrast, if stability is determined while the peak detection method is in activation (S76), then processing of the peak detection method is temporally interrupted.

After the mode is changed to the peak detection method, peak (top) values, amplitudes, and decay ratios obtained by difference between the amplitudes are each outputted as monitoring parameters (S79). Based on these monitoring parameters, determination of the trip signal is conducted (S80A, S80B, S80C). Further, filtered signal data without being subjected to the peak detection method are also included in the monitoring parameters, and the trip signal determination is performed (S80D).

For these monitoring parameters, their trip determination criteria are adjusted with reference to group characteristics and oscillation modes (S82), and their trip determination is performed (S80). The decay ratio is added to the monitoring parameters only when an amplitude value exceeds the criterion.

When trip determination is performed in accordance with the trip determination criterion for every parameter based on the peak detection method (S80A, S80B, S80C), trip signals are inputted into a logical gate (S83).

It is to be noted that the logical gate is formed of an OR gate in the case of executing oscillation suppression operation according to any one of the trip determinations (S80A, S80B, S80C), or formed of an AND gate in the case where the oscillation suppression operation is not operated if a plurality of trip determinations are not executed.

The trip signal for the trip determination performed directly based on the standard deviation of oscillation periods (S80D) is inputted into the OR gate (S84). The results of trip determination (S80A, S803, S80C) based on the peak detection method are also inputted into the OR gate. In this OR logic, when any one of the trip signals is issued, the oscillation suppression operation would be activated automatically (S85). The oscillation suppression operation herein refers to power reduction operation by control rod insertion.

(Second Embodiment)

Figure 27:
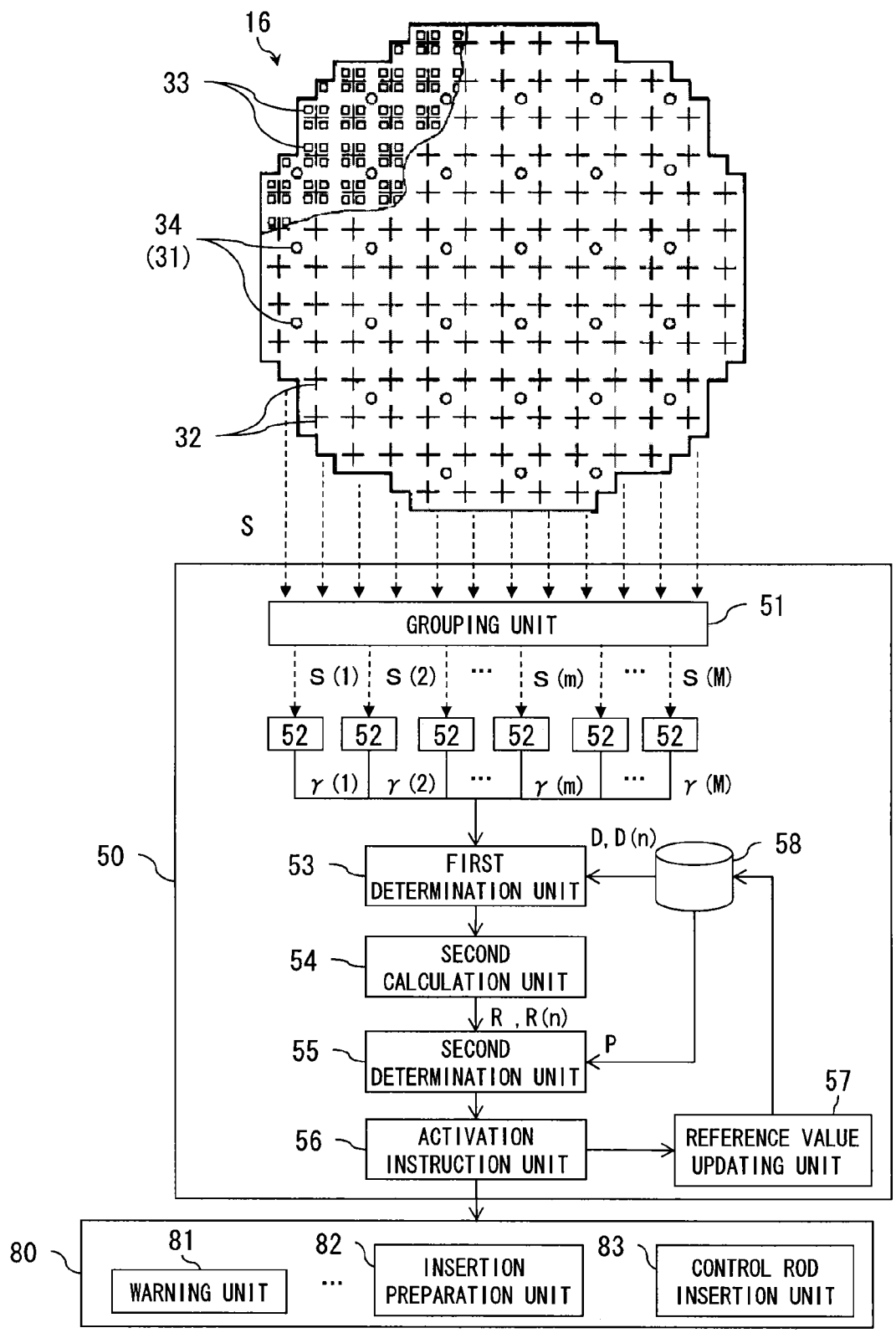
FIG. 27 is a block diagram showing a second embodiment of a nuclear reactor power monitor according to the present invention.

As shown in FIG. 27, a power monitor 50 includes: a first calculation unit 52 configured to calculate a decay ratio γ as a first stability index based on time series data t indicating power oscillation in nuclear instrumentation signals S outputted from a plurality of nuclear instrumentation detectors 31 which detect neutrons in a reactor core 16; a first determination unit 53 configured to compare the first stability index (decay ratio γ) and a first reference value D and determine whether nuclear thermal hydraulic stability of the reactor core 16 is stable or deteriorated; a second calculation unit 54 configured to calculate a second stability index R of the reactor core 16 by counting the time series data determined to indicate deterioration in the first determination unit 53; and a second determination unit 55 configured to compare the second stability index R and a second reference value P and determine whether to perform suppressing operation of the power oscillation.

A power suppression device 80 includes a plurality of devices different in suppression level, such as a warning unit 81, an insertion preparation unit 82, and a control rod insertion unit 83.

Specific physical quantity to be handled is different between in the first embodiment and in the second embodiment and onward. In order to avoid confusion, in the second embodiment and onward, the first stability index is expressed as the decay ratio γ, the second stability index is stated with "R" suffixed thereto, the first reference value is stated with "D" suffixed thereto, and the second reference value is stated with "P" suffixed thereto for differentiation.

A grouping unit 51 is configured to classify a plurality of nuclear instrumentation detectors 31 into groups. In the second embodiment, grouping is performed according to the aforementioned levels A to D. Nuclear instrumentation signals S(1) to S(M) outputted from any one of these groups (used herein is a group of the nuclear instrumentation detectors 31 placed at level B) are outputted to the first calculation unit 52, where decay ratios γ(1) to γ(M) are calculated. In the second calculation unit 54, the second stability index R is calculated with this group as a unit, and the second determination unit 55 judges whether or not the activation instruction unit 56 activates the power suppression device 80.

The first calculation unit 52 applies digital processing and processing for removing noise and trend components to the received nuclear instrumentation signals S, and extracts time series data made up only of power oscillation components. A statistical method is applied to the time series data to obtain the decay ratio with high precision.

Examples of the method for statistically obtaining the decay ratio include a method for directly obtaining an autocorrelation function and setting a delay time with which the correlation function has a maximum value as the oscillation period, a method for obtaining spectral density by a method such as FFT (Fast Fourier Transform) and an autoregressive method and setting an inverse of a frequency (resonance frequency, Hz) at which the spectral density is the maximum as the oscillation period, a method for obtaining a transfer function by the autoregressive method and obtaining the oscillation period from a resonance frequency estimated from a transfer function pole, and a method for obtaining an impulse response by the autoregressive method and obtaining the oscillation period based on a relation shown in FIG. 4.

When any one of these method is used, a certain data length (including several oscillation periods or more) is needed in order to achieve accurate estimation.

Figure 28A:
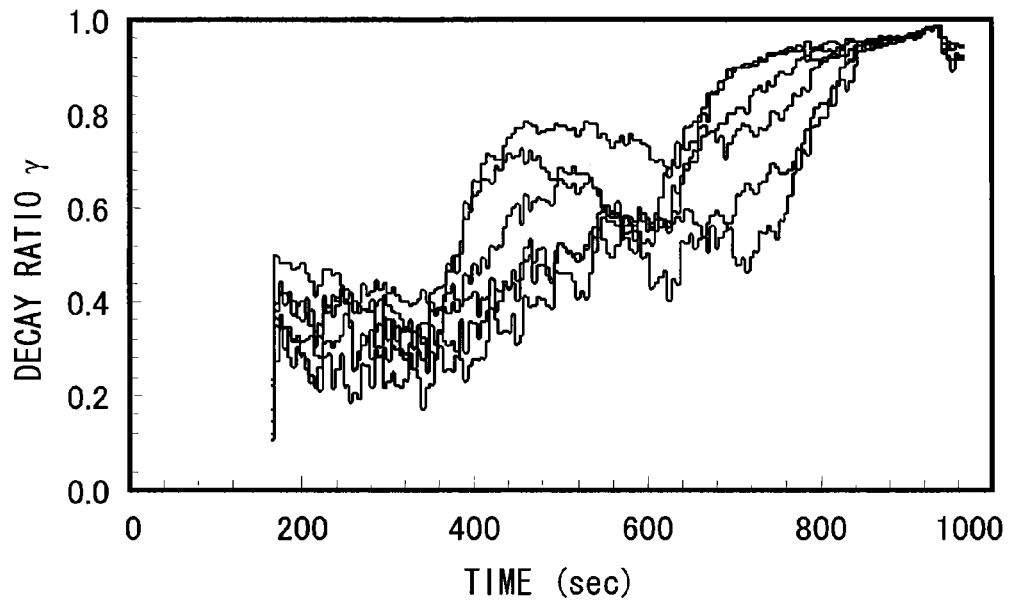

FIG. 28(A) shows overwritten graphs representing decay ratios γ of six signals, selected out of M decay ratios γ sequentially outputted every 5 sec from the first calculation unit 52, in the process of the nuclear thermal hydraulic stability shifting from a stable state to an unstable state.

Figure 28B:
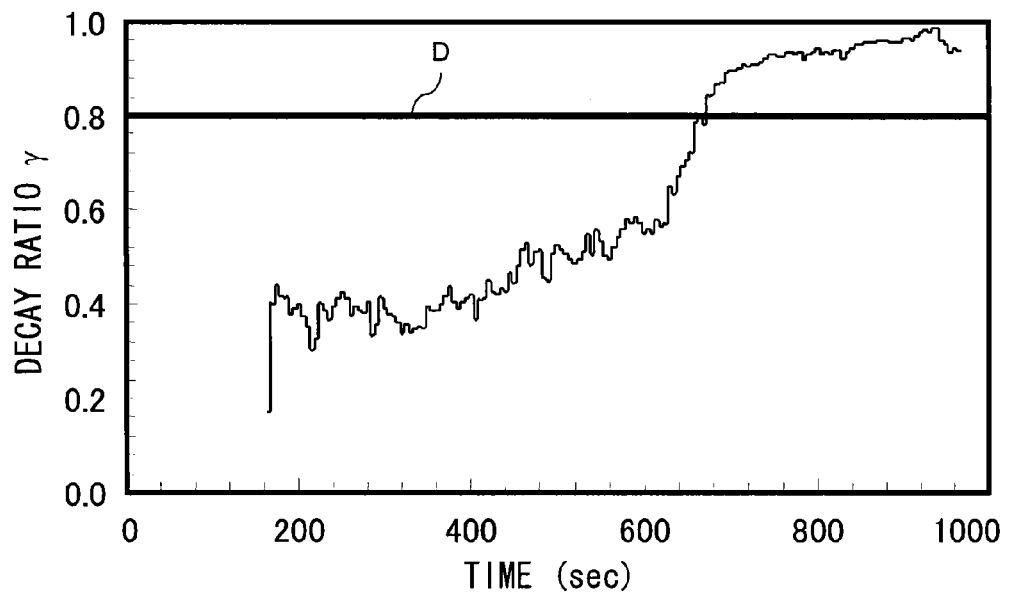
FIG. 28B is a graph view showing one representative signal out of the signals.
Figure 29A:
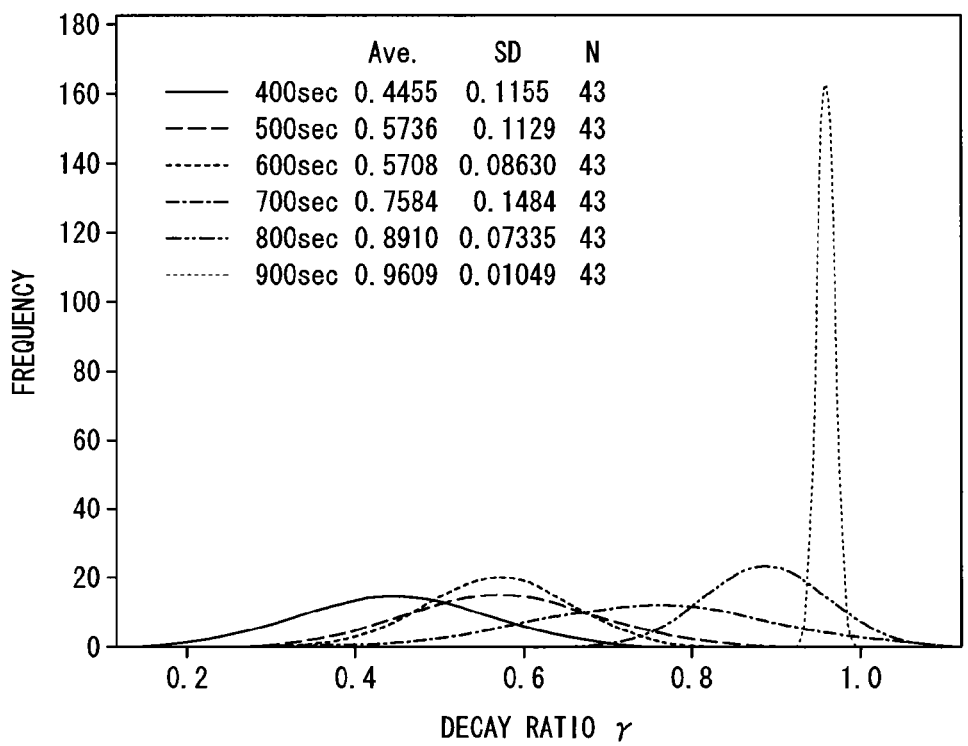

FIG. 29(A) shows a frequency distribution of the decay ratios γ of a plurality of nuclear instrumentation signals (43 signals) at each point of time (400, 500, 600, 700, 800 and 900 sec) during the same period as in FIG. 28.

The distribution at 400 sec indicates an average decay ratio γ of 0.45 and a standard deviation of 0.12, the distribution at 500 sec indicates an average decay ratio γ of 0.57 and a standard deviation of 0.11, the distribution at 600 sec indicates an average decay ratio γ of 0.57 and a standard deviation of 0.09, the distribution at 700 sec indicates an average decay ratio γ of 0.76 and a standard deviation of 0.15, and the distribution at 800 sec indicates an average decay ratio γ of 0.89 and a standard deviation is 0.07.

In the distribution at 900 sec, the average decay ratio γ is 0.96 and the standard deviation is as small as 0.01, indicating an extremely coherent distribution. It is indicated that at the point of 900 sec, the nuclear thermal hydraulic instability state uniformly spreads over the entire reactor core.

Thus, as the stable state changes to the unstable state, the decay ratio γ increases and its variations (standard deviation) tend to become smaller.

Figure 29B:
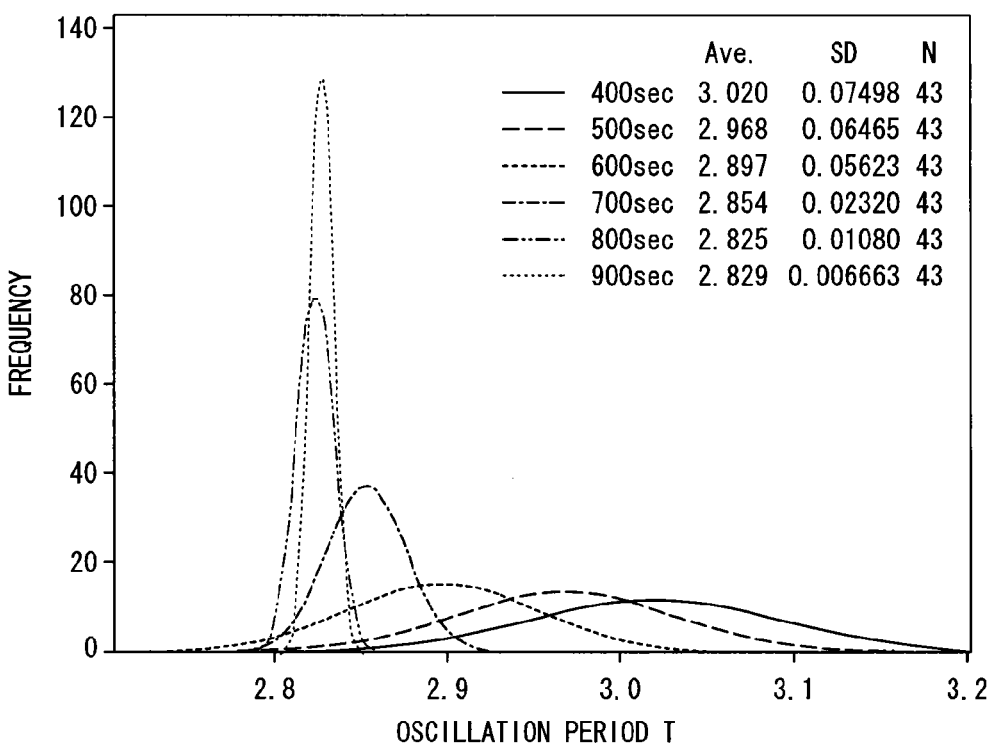
FIG. 29B is a graph view showing a frequency distribution of oscillation periods.

FIG. 29(B) shows a frequency distribution of oscillation period T under the same conditions as in FIG. 29(A). In the oscillation period T, there is also shown that the variations tend to become smaller in connection with the destabilization as in the case of the decay ratio γ. However, it can be said that the monotonicity of the change in the oscillation period T due to the change from the stable state to the unstable state is inferior to the decay ratio γ.

Consequently, it can be said that using the value of the decay ratio γ itself as a monitoring object is suitable for evaluating the nuclear thermal hydraulic stability with high accuracy.

FIG. 28(B) shows one signal representing the signals of the decay ratio γ shown in FIG. 28(A). A first reference value D shown herein is a value for identifying whether the reactor core is in a stable state or an unstable state in the corresponding decay ratio γ.

As the first reference value D takes a larger value, the criterion for judging the unstable state becomes more lenient, whereas as the value D takes a smaller value, the criterion for judging the unstable state becomes severer. A storage unit 58

(FIG. 27) stores one first reference value D or N first reference values D(n) (n; 1–N) each having a different value.

In the first determination unit 53 (FIG. 27), each of a plurality of decay ratios γ(m) (m; 1–M) included in the group are compared in size with the first reference value D (Formula (3)).

$$\gamma(m) \geq D \quad (3)$$

The second calculation unit 54 counts the number of the decay ratios γ(m) which exceed the first reference value D (which satisfies Formula (3)).

Operation of the second calculation unit 54 will be explained with reference to FIG. 28(B).

In this case, the first reference value D is set at 0.8. As the reactor core is gradually destabilized, the decay ratio γ slowly increases, then rapidly increases at the point around 640 sec, and reaches the first reference value D at around 680 sec. The decay ratio γ goes below the first reference value D only for a short period but immediately exceeds the value D. Accordingly, at the moment when the decay ratio γ exceeds the first reference value D for the first time, a peripheral region of the pertinent nuclear instrumentation detector 31 is judged to be destabilized, and this destabilization is counted up in the second calculation unit 54.

More specifically, out of the decay ratios γ(m) (m; 1–M) in the group at a certain point, one that satisfies Formula (3) is added as a(m)=1, and one that does not satisfy Formula (3) is added as a(m)=0. Then, the total of all the added-up a(m) (m; 1–M) is calculated, and the calculated value is divided by sum total M. The value thus normalized is defined as a second stability index R (Formulas (4) to (6)). The second stability index R takes a value from 0 to 1 (Formula (7)).

$$a(m)=1 \ (\gamma(m) \geq D) \quad (4)$$

$$a(m)=0 \ (\gamma(m)<D) \quad (5)$$

$$R=\text{SUM}\{a(1):a(m)\}/M \quad (6)$$

$$0 \leq R \leq 1 \quad (7)$$

Then, in the second determination unit 55, the second stability index R is compared in size with a second reference value P stored in the storage unit 58 (Formula (8)). The second reference value P is a value for identifying whether the reactor core is in the stable state or the unstable state in the pertinent group.

If Formula (8) is satisfied, it is judged that the nuclear thermal hydraulic stability of the nuclear reactor is deteriorated, and the activation instruction unit 56 instructs activation to the power suppression device 80 of the reactor core.

$$R \geq P \quad (8)$$

Figure 30A:
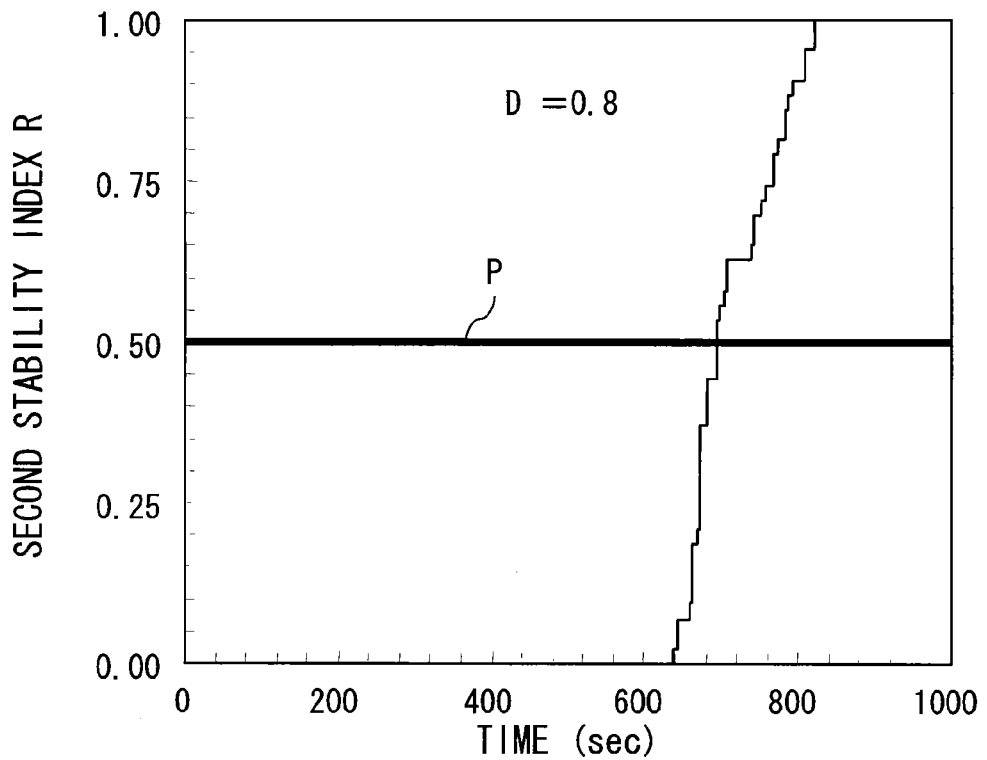

FIG. 30(A) is a graph view showing the second stability index R calculated over the same period as in FIG. 28 with the first reference value D being set at 0.8. The second reference value P is set at 0.5 which signifies that more than half of the nuclear instrumentation signals S are destabilized.

In FIG. 30(A), the second stability index R begins to take a non-zero value at the point around 640 sec, then rises at high speed, and exceeds the second reference value P (=0.5) at the point around 700 sec.

As shown in the graph of FIG. 30(A), a rise speed of the second stability index R is relatively high. Accordingly, it can be said that the timing for judging that the group is in the unstable state (Formula (8) is satisfied) is less dependent on the value taken by the second reference value P. For example, time difference between the second reference values P taking a value of 0.4 and taking a value of 0.6 is only 25 sec.

Figure 30B:
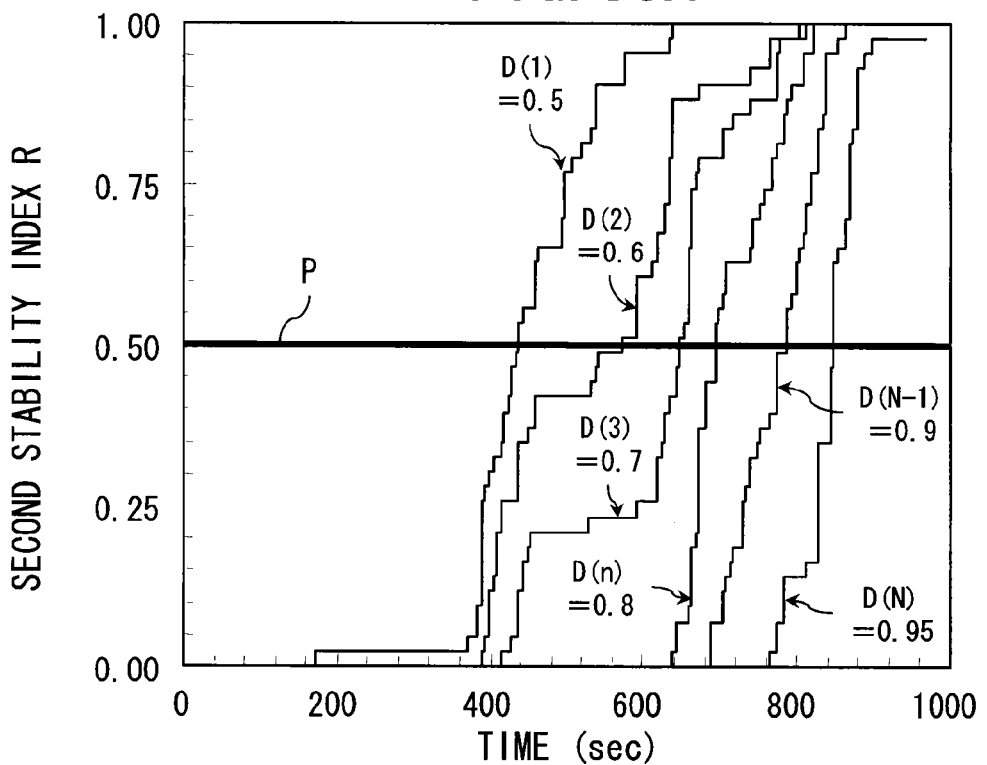
FIG. 30B is a graph view showing the changes when the first reference value is gradually changed in the range from 0.5 to 0.95.

FIG. 30(B) is a graph view showing the second stability index R in the case of setting the first reference value D(n) (n; 1–N) in the range of 0.5 to 0.95 in stages.

It is observed that the index R tends to have a steeper rising edge and becomes more linear as a preset value of the first reference-value D(n) becomes larger. When the set value of the first reference value D(n) is small, a plateau region is observed as the index R, which once took a non-zero value, stays there for a while without rising up.

Accordingly, the storage unit 58 shown in FIG. 27 stores N first reference values N D(n) (n; 1–N) each having a different value. The reference value updating unit 57 updates the first reference value D(n), which is applied to Formulas (4) and (5), once the corresponding second stability index R(n) exceeds the second reference value P (satisfies Formula (8)).

Whenever the second stability index R(n) corresponding to the updated first reference value D(n) satisfies Formula (8), the activation instruction unit 56 instructs gradual activation to the power suppression devices 80 (warning unit 81, insertion preparation unit 82, control rod insertion unit 83) which are different in the suppression level.

For example in FIG. 30(B), in an initial state where the index R shifts from stability to instability, the first reference value D(1) is applied, so that an alarm is issued at the point around 400 sec when the index R reaches the second reference value P (=0.5). In the final stage, the first reference value D(N) is applied, and so the nuclear reactor is tripped at the point around 820 sec. Thus, since entry into the unstable state is warned about 7 min before reaching the final stage, it becomes possible to secure time for an operator to examine a cause thereof and manually take appropriate measures.

It is thus possible to inform signs of destabilization to the operator in advance without activating the oscillation suppression device (control rod insertion unit 83) which may possibly scram the nuclear reactor all at once. Moreover, by evaluating the second stability index R while increasing the first reference value D(n) in stages, it becomes possible to take prompt measures against changes of state and to execute more flexible and more reliable monitoring.

A description will be given of a map 70 which is applied to each embodiment with reference to FIG. 31.

The map 70 shows placement configuration of a plurality of nuclear instrumentation detectors 31 included in the same group. The map further displays the decay ratio γ of each nuclear instrumentation detector 31 so that the decay ratios γ that exceed the first reference value D (that satisfy Formula (3)) and the decay ratios γ that does not exceed the first reference value D (that do not satisfy Formula (3)) are displayed in a distinguishable manner.

In addition to the case where display of the map 70 may be updated in real time when processing of the first determination unit 53 is completed, there is a case where the map 70 is automatically displayed in synchronization with instruction by the activation instruction unit 56 to activate the power suppression device 80.

Now, an operation example will be described with reference to the graph view of FIG. 30(B). When the second stability index R with the first reference value being D(1) =0.5, which is a first graph line, exceeds the second reference value P at the point around 400 sec, an alarm is issued. With this alarm sounding, the map 70 is displayed on a monitor screen, and the operator can monitor the monitor screen to check what kind of signs of destabilization phenomena are occurring.

Figure 31:
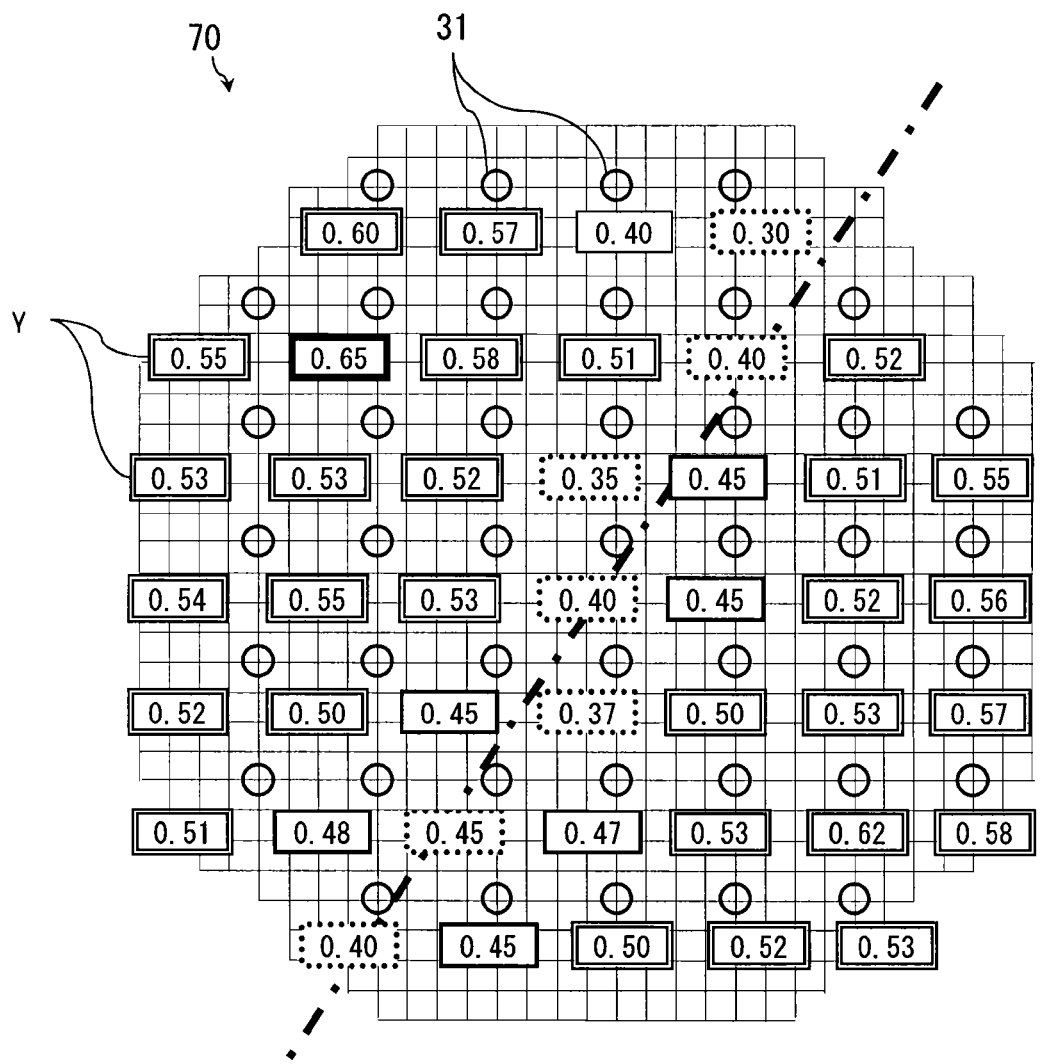
FIG. 31 is an explanatory view of a map applied to each embodiment.

In short, a numeric value of the decay ratio γ in those nuclear instrumentation detectors 31 which exceed the first reference value D(1)=0.5 is encircled with a double frame as shown in FIG. 31. A numeric value of the decay ratio γ which indicates the maximum is encircled with a thick wire frame. Accordingly, the operator can estimate what kind of unstable mode is occurring. According to the map 70, the nuclear instrumentation detectors 31 which exceed the first reference value D are distributed across a diagonal line shown with a dashed dotted line, indicating the signs of regional instability with the diagonal line as a node of oscillation. It becomes easy to visually understand such a diagonal line by, for example, encircling the decay ratio indicating the minimum with a dotted frame in each row in an array of the nuclear instrumentation detectors 31.

Figure 32:
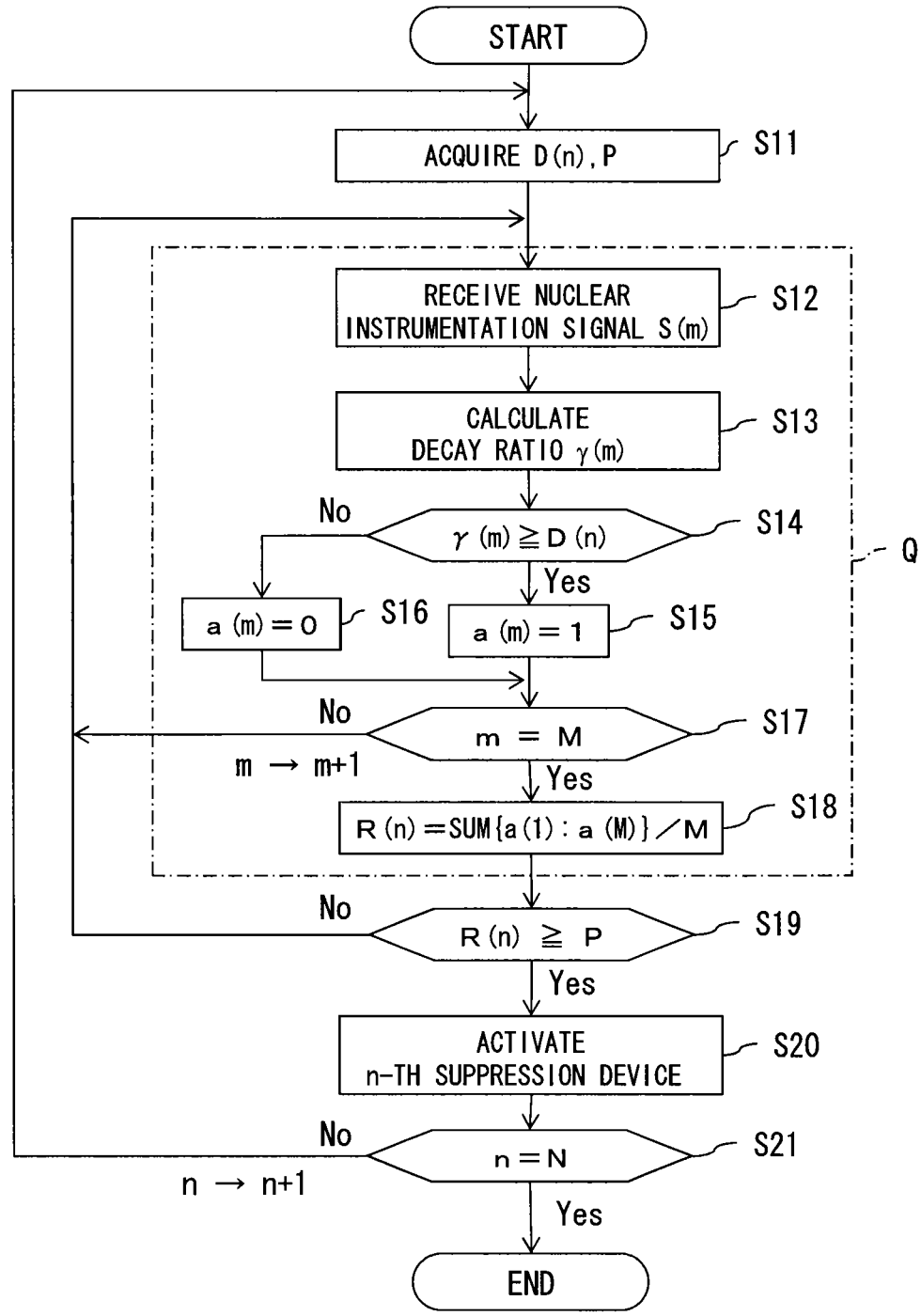
FIG. 32 is a flowchart explaining operation of the nuclear reactor power monitor according to the second embodiment.

A description will be given of the operation of the nuclear reactor power monitor according to the second embodiment with reference to a flowchart of FIG. 32 (with reference to FIG. 27 where appropriate).

First, a first reference value D(n) (n; 1–N) and a second reference value P are acquired (S11). Then, the nuclear instrumentation signals S(m) (m; 1–M) outputted from M nuclear instrumentation detectors 31 within the group are received (S12), and respective decay ratios γ(m) (m; 1–M) are calculated (S13).

Each of M decay ratios γ(m) are compared with the first reference value D(n) (n=1), and 1 is counted for every decay ratio γ that exceeds the value D (S14: Yes, S15), and 0 is counted for every decay ratio γ that does not exceed the value D (S14: No, S16). This processing is executed for the decay ratios γ(m) within the group (S17: No). Once the processing is executed for all of M decay ratios (S17: Yes), a second stability index R(n) (n=1) is calculated (S18).

Next, the second stability index R(n) (n=1) is compared with the second reference value P. If the index R does not exceed the value P (S19: No), a routine Q from S12 to S18 is repeated with n=1 being fixed.

If the second stability index R(n) (n=1) exceeds the second reference value P (S19: Yes), then a first suppression device (warning unit 81) is activated (S20).

Further, n=2 is set (S21: No), and the first reference value D(n) is updated (S11). Then, the routine from S12 to S21 is repeated. Once a value n is updated and the final N-th suppression device (control rod insertion unit 83) is activated (S21: Yes), the operation of the power monitor 50 is completed.

Thus, with the second stability index R(n) derived with gradual increase in the first reference value D(n), oscillation suppression operation can be advanced gradually as in the stages of light alarm, serious alarm, control rod insertion preparation start, and control rod insertion. Particularly, preliminary alarm issuance can prevent unexpected and automatic activation of control rod insertion as an oscillation suppression device, resulting in reduction in load on the operator.

(Third Embodiment)

Figure 33:
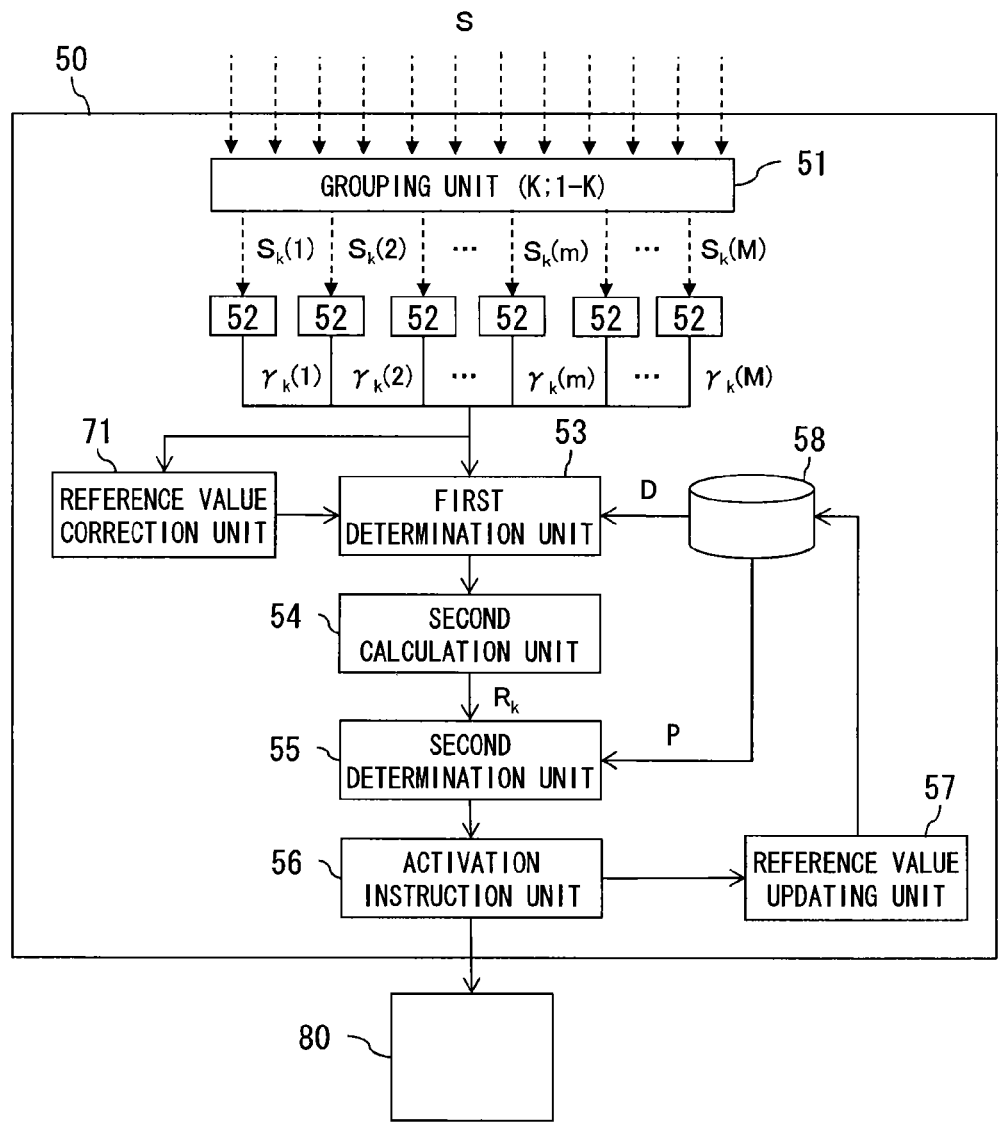
FIG. 33 is a block diagram showing a nuclear reactor power monitor according to a third embodiment.

With reference to FIG. 33, a nuclear reactor power monitor according to a third embodiment will be explained. In FIG. 33, component members identical or corresponding to those in FIG. 27 are designated by identical reference signs, and foregoing descriptions are used therefor to omit detailed explanation.

A power monitor 50 of the third embodiment is different from the power monitor of the second embodiment in that the activation instruction unit 56 instructs activation of the power suppression device 80 when a second stability index $R_k$ exceeds the second reference value P at least in two or more groups.

The power monitor 50 of the third embodiment is further different from the power monitor of the second embodiment in that a reference value correction unit 71 is included.

Figure 34:
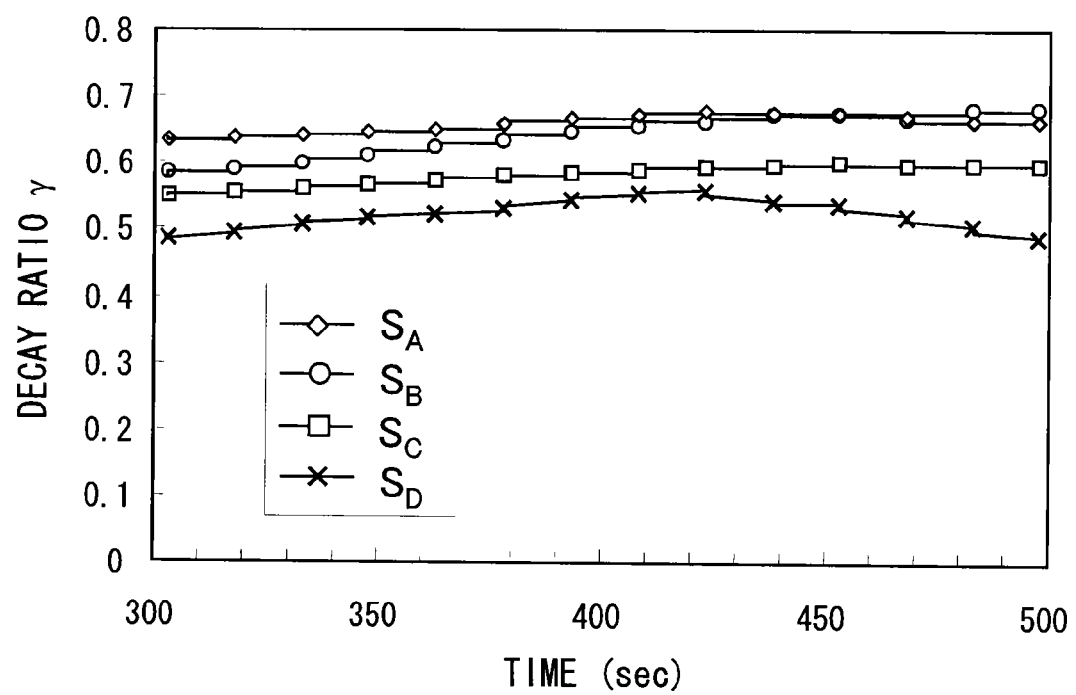
FIG. 34 is a graph view showing decay ratios of nuclear instrumentation signals outputted from nuclear instrumentation detectors placed at positions different in a vertical direction.

A graph of FIG. 34 represents decay ratios of nuclear instrumentation signals $S_A$ to $S_D$ outputted from the nuclear instrumentation detectors 31A to 31D (FIG. 1) placed at positions different in a vertical direction.

The graph indicates that the decay ratios γ of the nuclear instrumentation signals $S_A$ and $S_B$ of levels A and B located on a lower side in a vertical direction are more sensitive than the decay ratios γ of the nuclear instrumentation signals $S_C$ and $S_D$ of levels C and D on an upper side.

In grouping the nuclear instrumentation detectors 31, the detectors 31 classified as the same height levels are conveniently grouped together. However, when such grouping is performed, it is necessary to take into consideration the difference in detector sensibility between the levels in advance.

The reference value correction unit 71 (FIG. 33) has a function of obtaining, in each of K groups classified, an average value of decay ratios $γ_k(m)$ in a unit of the k-th group (k; 1–K) and correcting a first reference value $D_k$ based on a deviation $u_k$ among the obtained average values.

More specifically, an average value $<γ_k>$ of the decay ratios in the k-th group is expressed by Formula (9), where M denotes the number of decay ratios $γ_k(m)$ to be outputted:

$$<γ_k>=\mathrm{SUM}\{γ_k(1):γ_k(M)\}/M \qquad (9)$$

When a largest value among the average decay ratios $<γ_k>$ of the respective groups 1 to K is defined as max$<γ>$, the deviation $u_k$ is expressed by Formula (10) and the first reference value $D_k$ applied to each group is expressed by Formula (11):

$$u_k=\max<γ>-<γ_k> \qquad (10)$$

$$D_k=D-u_k \qquad (11)$$

Figure 35:
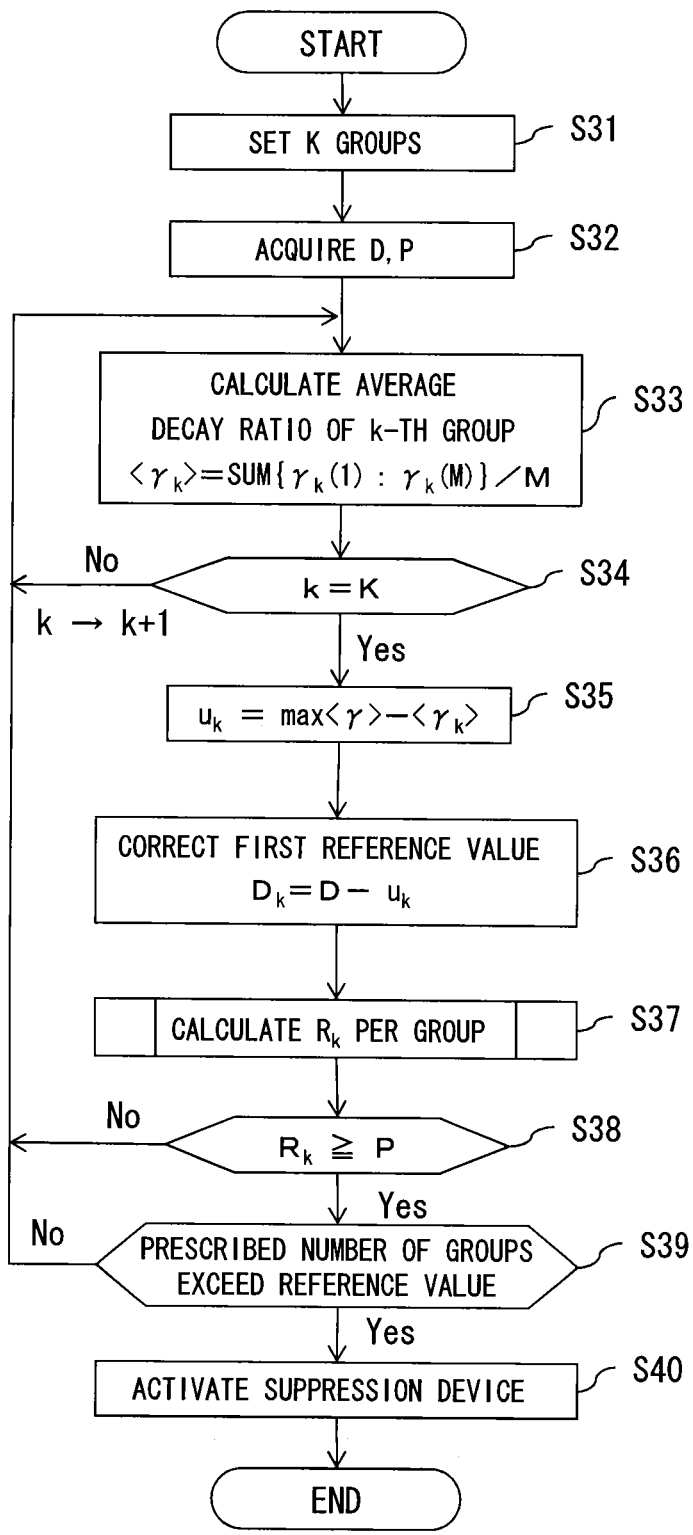
FIG. 35 is a flowchart explaining operation of the nuclear reactor power monitor according to the third embodiment.

A description will be given of the operation of the nuclear reactor power monitor according to the third embodiment with reference to a flowchart of FIG. 35 (with reference to FIG. 33 where appropriate).

A plurality of nuclear instrumentation detectors 31 placed in the reactor core 16 are classified into K groups (S31). One group is herein constituted of M nuclear instrumentation detectors 31. Then, an initial value of the first reference value D and the second reference value P are acquired (S32).

An average decay ratio $<γ^k>$ of the k-th group is obtained in order starting from k=1 (S33, S34: No) till the average decay ratios of all K groups are obtained (S34: Yes). Then, a largest value among the average decay ratios $<γ_k>$ of the respective groups 1 to K is defined as max$<γ>$, and a deviation $u_k$ between max$<γ>$ and the average decay ratio $<γ_k>$ of the k-th group is obtained (S35). Further, the initial value of the first reference value D acquired in step S32 is corrected using the deviation $u_k$ to acquire a first reference value $D_k$ which is applied to the k-th group (S36).

Then, the first reference value $D_k$ which is different per group is applied to the routine Q (FIG. 32) to calculate a second stability index $R_k$ for the k-th group (S37). When the second stability index $R_k$ does not exceed the second reference value P (S38: No), the routine from steps S33 to S37 is repeated. Even when any one of K second stability indexes $R_k$ exceeds the second reference value P, the routine from step S33 to step S38 is repeated unless a prescribed number of the second stability indexes $R_k$ exceed the second reference value P (S39: No).

Once the second reference value P is exceeded by a prescribed number of the groups (S39: Yes), the suppression device 80 is activated (S40), and the operation of the power monitor 50 is completed.

Also in the third embodiment, as in the case of the second embodiment, a plurality of first reference values D(n) may be registered into the storage unit 58 in advance, and a plurality of power suppression devices 80 different in the suppression level (warning unit 81, insertion preparation unit 82, control rod insertion unit 83) may also be activated in stages.

Examples of the grouping method may include various classifying methods other than the classifying method by the height level as described before. In the aforementioned classifying method in which grouping is performed by the height level, it is necessary to take into consideration in advance the difference in detector sensibility between the levels.

Accordingly, if the plurality of nuclear instrumentation detectors 31 are classified so that the average decay ratio $<\gamma_k>$ in each group is evened, such consideration is no longer necessary. In this case, in the operation flow of FIG. 35, the flow of step S33 to step S36 can be omitted.

Examples of such grouping methods include a method for allotting the nuclear instrumentation detectors 31 of four levels A to D to all the groups at the same rate. For example, in this method, the detectors 31 are classified in order toward the right-hand side from an upper left part of the reactor core 16 of FIG. 27, so that the first group includes A/B/C/D/A/B/C . . . , the second group includes B/C/D/A/B/C/D . . . , the third group includes C/D/A/B/C/D/A . . . , and the fourth group includes D/A/B/C/D/A/B . . . .

In this case, occurrence of deviation in the average decay ratios between the groups becomes less likely, and also the information on placement configuration of the nuclear instrumentation detectors 31 in the reactor core can also be stored. However, in the case of comparing the decay ratios $\gamma$ displayed on the map 70 as in FIG. 31, it is necessary to estimate and correct deviation in a vertical direction level. Moreover, in the case of simply handling the entire detectors as one group, it suffices to use a signal obtained by averaging four signals of each instrumentation pipe 34. In the case of preparing only two groups, they may use, for example, an average of (A+C) and an average of (B+C), or an average of (A+D) and an average of (B+D). In the case of three groups, using a method for grouping by three levels except the level D makes it possible to omit correction.

(Fourth Embodiment)

Figure 36:
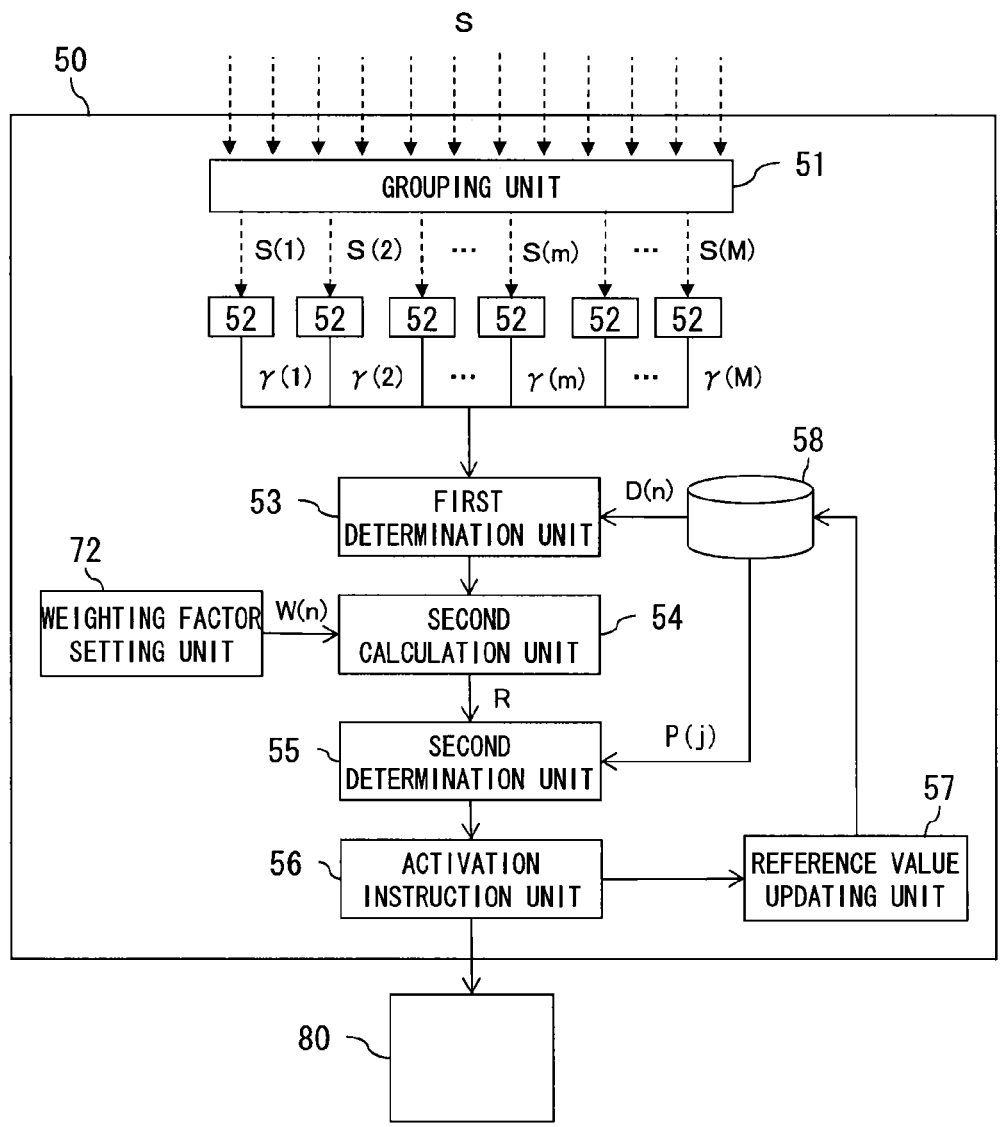
FIG. 36 is a block diagram showing a nuclear reactor power monitor according to a fourth embodiment.

With reference to FIG. 36, a nuclear reactor power monitor according to a fourth embodiment will be explained. In FIG. 36, component members identical or corresponding to those in FIG. 27 are designated by identical reference signs, and foregoing descriptions are used therefor to omit detailed explanation.

A power monitor 50 of the fourth embodiment is different from the power monitors of the second embodiment and the third embodiment in that a weighting factor setting unit 72 configured to set a weighting factor W(n) is included and that the reference value updating unit 57 updates a second reference value P(j) applied to Formula (8) in the next routine once an integrated second stability index R exceeds the second reference value P(j) (satisfies Formula (8)).

The second calculation unit 54 calculates a plurality of second stability indexes R(n) corresponding to N first reference values D(n) (n; 1–N) which are different in value, based on Formulas (4) to (6).

Then as shown in Formula (12), each of the second stability indexes R(n) (n; 1–N) is multiplied by a corresponding weighting factor W(n) (n; 1–N), and resulting values are added up and outputted as a second stability index R.

$$R = \text{SUM}\{W(1) \times R(1) : W(N) \times R(N)\} \quad (12)$$

In this case, as shown in Formula (13), the weighting factor W(n) is normalized so that a sum of values corresponding to each of the second stability indexes R(n) is equal to 1.

$$\text{SUM}\{W(1) : W(N)\} = 1 \quad (13)$$

In the graph view of FIG. 37(A), the second stability index R calculated in the same period as in FIG. 28 is shown with a solid line, while terms of R(n) and (n; 1–N) are shown with a broken line.

In the foregoing second embodiment, the second stability index R(n) is expressed separately at each of a plurality of set points n. However, in the fourth embodiment, one integrated second stability index R is expressed in this way.

It can be said that the integrated second stability index R includes characteristics of individual second stability index R(n) responses, that is, the second stability index R slowly rises in a stable state with a small decay ratio $\gamma$, and suddenly rises with progress of an unstable state.

As shown in Formula (14), if the weighting factor W(n) is set to be larger with increase in set point n, accuracy of monitoring the progressing instability can be enhanced.

As shown in Formula (15), the weighting factor W(n) can be expressed as a geometrical progression using a common ratio r.

$$W(n+1) > W(n) \quad (14)$$

$$W(n+1) = r \times W(n) \quad (15)$$

FIG. 37(B) shows the second stability index R when the common ratio r of the weighting factor W(n), which constitutes a geometrical progression, is gradually varied to 1.0, 1.5, and 2.0.

Thus, rising-edge sensibility can be changed by varying the weighting factor W(n). If the common ratio r is set to be larger, rise with a small decay ratio $\gamma$ is slow and therefore a plateau region will appear. More specifically, if stability does not greatly change, the integrated second stability index R keeps generally a constant value. In contrast, as the decay ratio $\gamma$ becomes larger, an increasing rate of the second stability index R rapidly becomes larger, resulting in a steep rise.

In FIG. 37(B), the point around 650 sec when the index R rises from the plateau coincides with the point of definite occurrence of regional oscillation though small in amplitude. It is possible, therefore, to advantageously distinguish such a physical phenomenon in a visually-aided manner. Thus, as the weighting factor W(n), an optimal value can be set depending on the purpose of detection, such as improvement of sensibility for instability detection, and identification of specific phenomena.

A description will be given of the operation of the nuclear reactor power monitor according to the fourth embodiment with reference to a flowchart of FIG. 38 (with reference to FIG. 36 where appropriate).

First, a first reference value D(n) (n; 1–N) of a set point n is acquired (S51), and a weighting factor W(n) corresponding to the set point n is set (S52). Further, a second reference value P(j) (j=1) is acquired (S53).

A routine Q (FIG. 32) is applied to the first reference value D(n) (n; 1–N) to calculate individual second stability indexes R(n) and to calculate an integrated second stability index R (S54). If the integrated second stability index R does not exceed the second reference value P(j) (j=1) (S55: No), the routine of step S54 is repeated. Once the integrated second stability index R exceeds the second reference value P(j) (j=1) (S55: Yes), the j-th power suppression device 80 (j=1) is activated (S56), and a light alarm is issued.

Further, j=2 is set (S57: No), and the second reference value P(j) is updated (S53). Then, the routine from step S53 to S57 is repeated. Once a value j is updated and the final J-th suppression device (control rod insertion unit 83) is activated (S57: Yes), the operation of the power monitor 50 is completed.

Thus, also in the fourth embodiment, setting a plurality of second reference values P(j) makes it possible to gradually activate a plurality of power suppression devices 80 (warning unit 81, insertion preparation unit 82, control rod insertion unit 83) different in the suppression level as in the second embodiment.

It is also possible in the fourth embodiment, as in the third embodiment, to set a plurality of groups and activate a suppression device once a prescribed number of groups exceed the reference value.

As shown in the foregoing, the present invention makes it possible to detect power oscillations caused by nuclear thermal hydraulic instability in the nuclear reactor with high reliability and to suppress power oscillations without the power oscillations exerting serious influence on the soundness of fuels and plants, thereby contributing to safe and efficient operation of the nuclear reactor.

The present invention is not limited to the above described embodiments. The invention can be appropriately deformed and implemented within the scope of common technical concepts.

For example, the present invention can implement respective devices as respective functional programs by computer. The respective functional programs may be combined to form a program for monitoring nuclear thermal hydraulic stability of the reactor core.

REFERENCE SIGNS LIST

10 Nuclear reactor, 11 Pressure vessel, 13 Steam separator, 14 Upper grid plate, 15 Shroud, 16 Reactor core, 17 Core support plate, 18 Recirculation pump, 21 Main line, 22 Turbine, 23 Generator, 24 Condenser, 25 Pump, 26 Water supply line, 30 Power monitor, 31 (31A, 31B, 31C, 31D) Nuclear instrumentation detector, 32 control rod, 33 Fuel assembly, 34 Instrumentation pipe, 35 Power suppression device, 40 Statistical processing unit, 41 Grouping unit, 42, 52 First calculation unit, 43 Reference value storage unit, 44, 53 First determination unit, 45 Peak detection unit, 46, 54 Second calculation unit, 47, 55 Second determination unit, 48 Third determination unit, 49 Variation analysis unit, 50 Power monitor, 51 Grouping unit, 56 Activation instruction unit, 57 Reference value updating unit, 58 Storage unit, 60 State estimation unit, 61 Process calculator, 62 Data base, 63 Nuclear thermal hydraulic simulator, 70 Map, 71 Reference value correction unit, 72 Weighting factor setting unit, 80 Power suppression device, 81 Warning unit, 82 Insertion preparation unit, 83 Control rod insertion unit, $\gamma$ ($\gamma_k$, $\gamma(m)$ m:1–M) Decay ratio, D (D(n) n:1–N) First reference value, P Second reference value, R ($R_k$, R(n) n:1–N) Second stability index, S ($S_A$, $S_B$, $S_C$, $S_D$, S(1)-S(m)) Nuclear instrumentation signal, $u_k$ Deviation, W(n)(n; 1–N) Weighting factor, $X_t$ Time series data.

The invention claimed is:

1. A nuclear reactor power monitor, comprising:
a first calculation unit configured to calculate a first stability index of the reactor core based on time series data which indicate a power oscillation in nuclear instrumentation signals outputted from a plurality of nuclear instrumentation detectors which detect neutrons in a reactor core;
a first determination unit configured to compare the first stability index and a first reference value and determine whether nuclear thermal hydraulic stability of the reactor core is stable or deteriorated;
a second calculation unit configured to calculate a second stability index of the reactor core based on the time series data when the nuclear thermal hydraulic stability is determined to be deteriorated in the first determination unit; and
a second determination unit configured to compare the second stability index and a second reference value and determine whether to perform suppressing operation of the power oscillation,
wherein in response to determination in the first determination unit and the second determination unit, any of an alarm, oscillation information and an automatic start signal of an oscillation suppression device is issued in stages as a suppression operation of the power oscillation.

2. The nuclear reactor power monitor according to claim 1, comprising
a grouping unit configured to divide the nuclear instrumentation detectors into groups, wherein
the grouping unit performs grouping of the nuclear instrumentation detectors based on information including any of an estimated power distribution of the reactor core, a higher order space mode distribution of neutron fluxes, and a specified fuel assembly position.

3. The nuclear reactor power monitor according to claim 2, wherein
the nuclear instrumentation signals processed in the first calculation unit and are individual signals of the nuclear instrumentation detectors selected from the groups or an average signal of a plurality of nuclear instrumentation detectors in units of the groups.

4. The nuclear reactor power monitor according to claim 2, wherein
the power distribution or the higher order space mode distribution of neutron fluxes is estimated based on a physical model or a data base.

5. The nuclear reactor power monitor according to claim 1, wherein
an index indicating variations in oscillation period of a plurality of the time series data is used as the first stability index.

6. The nuclear reactor power monitor according to claim 1, wherein
an amplitude or a decay ratio of a plurality of the time series data is used as the second stability index.

7. The nuclear reactor power monitor according to claim 5, wherein
the oscillation period is obtained by applying a statistical method including an autoregression analysis method, an autocorrelation function method, and a spectrum analysis method, to the time series data.

8. The nuclear reactor power monitor according to claim 6, wherein
the amplitude or the decay ratio is obtained by a peak detection method including fitting the time series data set on intervals by a polynomial and searching for a point where a differential value of the polynomial is equal to zero, and
the point where the differential value is equal to zero is first searched within a period of time, composed of half of the oscillation period and a margin, with a switchover point from the first determination unit as an origin, and then the point is searched within a period of time, composed of a half of the oscillation period and a margin, with searched point as an origin in a repeated manner.

9. The nuclear reactor power monitor according to claim 5, wherein
a sampling period of the time series data converted into digital data or the sampling period multiplied by a coefficient set in consideration of a decay ratio is used as the first reference value, and
the first determination unit executes the determination based on duration time during which the nuclear thermal hydraulic stability is indicated to be in a deteriorated state in comparison between the first stability index and the first reference value.

10. The nuclear reactor power monitor according to claim 8, wherein
a spline function is used as the polynomial, and
out of intervals which are interposed in between data points that constitute the time series data, an interval in which a product of derivatives of the data points placed on both sides of the interval is a minus-sign product is obtained, the obtained interval is further divided, and out of these dividing points, a point where an absolute value of a derivative is minimum is searched as the point where the differential value is equal to zero.

11. The nuclear reactor power monitor according to claim 1, wherein
while the second calculation unit is in operation, the first calculation unit is concurrently operated, and
when a determination to execute power control of the reactor core is not made in the second determination unit in predetermined time, operation of the second calculation unit is stopped and operation of the first calculation unit is continued.

12. The nuclear reactor power monitor according to claim 1, wherein
a spatial distribution of phase difference in the power oscillation is obtained based on phase difference in the time series data from the nuclear instrumentation detectors positioned at a local instability central region and peripheral regions of the local instability central region so as to estimate a power oscillation mode including any of a local oscillation, a regional oscillation and a core-wide oscillation.

13. The nuclear reactor power monitor according to claim 2, wherein
a power oscillation mode is estimated by calculating phase difference between average signals in units of the groups, and the first reference value and the second reference value are changed into optimum values corresponding to the estimated power oscillation mode.

14. A nuclear reactor power monitor, comprising:
a first calculation unit configured to calculate a first stability index of the reactor core based on time series data which indicate a power oscillation in nuclear instrumentation signals outputted from a plurality of nuclear instrumentation detectors which detect neutrons in a reactor core;
a first determination unit configured to compare the first stability index and a first reference value and determine whether nuclear thermal hydraulic stability of the reactor core is stable or deteriorated;
a second calculation unit configured to calculate a second stability index of the reactor core based on the time series data when the nuclear thermal hydraulic stability is determined to be deteriorated in the first determination unit; and
a second determination unit configured to compare the second stability index and a second reference value and determine whether to perform suppressing operation of the power oscillation, further comprising
a third determination unit configured to execute the power oscillation suppression operation if it is determined that the first stability index satisfies a third reference value which is set more severely than the first reference value even when the power oscillation suppression operation has been determined to be unnecessary based on the second stability index.

15. The nuclear reactor power monitor according to claim 1, wherein
the first calculation unit calculates a decay ratio as the first stability index, and
the second calculation unit calculates the second stability index by counting the time series data determined to indicate the deterioration in the first determination unit.

16. The nuclear reactor power monitor according to claim 15, wherein
the nuclear instrumentation detectors are divided into groups, and
the second calculation unit calculates the second stability index in units of the group.

17. The nuclear reactor power monitor according to claim 15, further comprising
a reference value updating unit configured to update the first reference value once the second stability index exceeds the second reference value, wherein
whenever the updating is performed, a plurality of power suppression devices different in suppression level are activated in stages.

18. The nuclear reactor power monitor according to claim 17, wherein
the power suppression devices include those implementing at least three kinds of different effects: alarm issuance; suppression preparation; and suppression.

19. The nuclear reactor power monitor according to claim 15, wherein
a decay ratio which exceeds the first reference value and a decay ratio which does not exceed the first reference value are distinguishably displayed on a map which displays placement configuration of the nuclear instrumentation detectors.

20. The nuclear reactor power monitor according to claim 19, wherein
the map is automatically displayed in synchronization with instruction to activate the power suppression device.

21. The nuclear reactor power monitor according to claim 16, wherein
an activation instruction unit instructs activation of the power suppression device when the second stability index exceeds the second reference value at least in two or more groups.

22. The nuclear reactor power monitor according to claim 21, comprising
a reference value correction unit configured to obtain an average value of the decay ratios in units of the group and to correct the first reference value based on a deviation between the average values.

23. The nuclear reactor power monitor according to claim 15, comprising
a weighting factor setting unit configured to set a weighting factor, wherein the second calculation unit calculates a plurality of second stability indexes based on the first reference values each having a different value, multiplies the calculated index values by the weighting factors corresponding to respective indexes, adds up the multiplied values, and then outputs the resulting value.

24. The nuclear reactor power monitor according to claim 23, wherein
the weighting factor is normalized to provide a value of 1 when respective values corresponding to the second stability indexes are added up.

25. The nuclear reactor power monitor according to claim 23, further comprising
a reference value updating unit configured to update the second reference value once the second stability index exceeds the second reference value.

* * * * *